United States Patent
Zou et al.

(10) Patent No.: US 11,848,910 B1
(45) Date of Patent: Dec. 19, 2023

(54) ASSIGNING STATEFUL PODS FIXED IP ADDRESSES DEPENDING ON UNIQUE POD IDENTITY

(71) Applicant: VMware, Inc., Palo Alto, CA (US)

(72) Inventors: Tao Zou, Beijing (CN); Danting Liu, Beijing (CN); Salvatore Orlando, Naples (IT); Wenfeng Liu, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 18/098,081

(22) Filed: Jan. 17, 2023

(30) Foreign Application Priority Data

Nov. 11, 2022 (WO) ................ PCT/CN2022/131254

(51) Int. Cl.
*H04L 61/5007* (2022.01)
*H04L 41/0895* (2022.01)
*H04L 41/044* (2022.01)

(52) U.S. Cl.
CPC ........ *H04L 61/5007* (2022.05); *H04L 41/044* (2013.01); *H04L 41/0895* (2022.05)

(58) Field of Classification Search
CPC ....... H04L 41/04; H04L 41/044; H04L 41/08; H04L 41/0895; H04L 61/50–5007
See application file for complete search history.

(56) References Cited

U.S. PATENT DOCUMENTS

| | | |
|---|---|---|
| 6,697,360 B1 | 2/2004 | Gai et al. |
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |

(Continued)

FOREIGN PATENT DOCUMENTS

| | | |
|---|---|---|
| AU | 2004227600 B2 | 5/2009 |
| CA | 3107455 A1 | 2/2020 |

(Continued)

OTHER PUBLICATIONS

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

(Continued)

*Primary Examiner* — Brendan Y Higa
(74) *Attorney, Agent, or Firm* — ADELI LLP

(57) ABSTRACT

Some embodiments provide a novel method for resiliently associating Internet Protocol (IP) addresses with pods that each have unique identifiers (IDs) in a managed cluster of worker nodes managed by a first set of one or more controllers of the managed cluster. The resilient association between IP addresses and pods is maintained even when pods are moved between worker nodes. At a second set of controllers, the method receives notification regarding deployment, on a first worker node, of a stateful pod associated with a particular ID. The method allocates an IP address to the stateful pod. The method creates a mapping between the IP address and the particular ID in order to maintain the allocation of the IP address to the stateful pod. The method provides the IP address to the first set of controllers to use for the stateful pod.

20 Claims, 14 Drawing Sheets

(56) References Cited

U.S. PATENT DOCUMENTS

| | | | |
|---|---|---|---|
| 9,152,803 | B2 | 10/2015 | Biswas et al. |
| 9,225,638 | B2 | 12/2015 | Jain et al. |
| 9,258,312 | B1 | 2/2016 | O'Neill et al. |
| 9,531,590 | B2 | 12/2016 | Jain et al. |
| 9,536,077 | B2 | 1/2017 | Bignon et al. |
| 9,590,901 | B2 | 3/2017 | Tubaltsev et al. |
| 9,594,546 | B1 | 3/2017 | Todd et al. |
| 9,674,275 | B1 | 6/2017 | Engers et al. |
| 9,755,898 | B2 | 9/2017 | Jain et al. |
| 9,774,537 | B2 | 9/2017 | Jain et al. |
| 9,813,509 | B1 | 11/2017 | Visser et al. |
| 9,825,810 | B2 | 11/2017 | Jain et al. |
| 9,935,827 | B2 | 4/2018 | Jain et al. |
| 9,979,641 | B2 | 5/2018 | Jain et al. |
| 10,095,669 | B1 | 10/2018 | Karppanen |
| 10,122,735 | B1 | 11/2018 | Wohlgemuth |
| 10,129,077 | B2 | 11/2018 | Jain et al. |
| 10,135,737 | B2 | 11/2018 | Jain et al. |
| 10,193,977 | B2 | 1/2019 | Ke et al. |
| 10,205,701 | B1 | 2/2019 | Voss et al. |
| 10,225,137 | B2 | 3/2019 | Jain et al. |
| 10,257,095 | B2 | 4/2019 | Jain et al. |
| 10,270,796 | B1 | 4/2019 | Veeraswamy et al. |
| 10,320,679 | B2 | 6/2019 | Jain et al. |
| 10,341,233 | B2 | 7/2019 | Jain et al. |
| 10,496,605 | B2 | 12/2019 | Melnik et al. |
| 10,516,568 | B2 | 12/2019 | Jain et al. |
| 10,547,521 | B1 | 1/2020 | Roy et al. |
| 10,594,743 | B2 | 3/2020 | Hong et al. |
| 10,609,091 | B2 | 3/2020 | Hong et al. |
| 10,613,888 | B1 | 4/2020 | Mentz et al. |
| 10,628,144 | B2 | 4/2020 | Myneni et al. |
| 10,652,143 | B2 | 5/2020 | Ravinoothala et al. |
| 10,693,782 | B2 | 6/2020 | Jain et al. |
| 10,708,368 | B1 | 7/2020 | Young et al. |
| 10,725,836 | B2 | 7/2020 | Savenkov et al. |
| 10,795,909 | B1 | 10/2020 | Bond et al. |
| 10,812,337 | B2 | 10/2020 | Vaidya et al. |
| 10,841,226 | B2 | 11/2020 | Mariappan et al. |
| 10,860,444 | B2 * | 12/2020 | Natanzon .............. G06F 11/203 |
| 10,942,788 | B2 | 3/2021 | Palavalli et al. |
| 10,944,691 | B1 | 3/2021 | Raut et al. |
| 10,951,661 | B1 | 3/2021 | Medan et al. |
| 10,972,341 | B2 | 4/2021 | Mudigonda |
| 10,972,386 | B2 | 4/2021 | Mackie et al. |
| 11,074,091 | B1 | 7/2021 | Nayakbomman et al. |
| 11,086,700 | B2 | 8/2021 | Myneni et al. |
| 11,159,366 | B1 | 10/2021 | Gawade et al. |
| 11,190,491 | B1 | 11/2021 | Kaciulis et al. |
| 11,194,483 | B1 | 12/2021 | Dontu et al. |
| 11,277,309 | B2 | 3/2022 | Vaidya et al. |
| 11,316,822 | B1 * | 4/2022 | Gawade .............. H04L 61/5061 |
| 11,436,057 | B2 | 9/2022 | Shen et al. |
| 11,500,688 | B2 | 11/2022 | Liu et al. |
| 11,570,146 | B2 | 1/2023 | Liu et al. |
| 11,606,254 | B2 | 3/2023 | Liu et al. |
| 11,671,400 | B2 | 6/2023 | Zhou et al. |
| 11,671,401 | B2 * | 6/2023 | Singh .................. H04L 61/5061 709/245 |
| 11,689,425 | B2 | 6/2023 | Vaidya et al. |
| 11,689,497 | B2 | 6/2023 | Shen et al. |
| 2004/0098154 | A1 | 5/2004 | McCarthy |
| 2005/0129019 | A1 | 6/2005 | Cheriton |
| 2007/0244962 | A1 | 10/2007 | Laadan et al. |
| 2007/0245334 | A1 | 10/2007 | Nieh et al. |
| 2010/0149996 | A1 | 6/2010 | Sun |
| 2010/0177674 | A1 | 7/2010 | Aggarwal |
| 2010/0211815 | A1 | 8/2010 | Mankovskii et al. |
| 2010/0246545 | A1 | 9/2010 | Berzin |
| 2010/0293378 | A1 | 11/2010 | Xiao et al. |
| 2011/0161988 | A1 | 6/2011 | Kashyap |
| 2011/0194494 | A1 | 8/2011 | Aso et al. |
| 2011/0282936 | A1 | 11/2011 | Chekhanovskiy et al. |
| 2011/0289508 | A1 | 11/2011 | Fell et al. |
| 2012/0117226 | A1 | 5/2012 | Tanaka et al. |
| 2012/0150912 | A1 | 6/2012 | Ripberger |
| 2012/0304275 | A1 | 11/2012 | Ji et al. |
| 2013/0018994 | A1 | 1/2013 | Flavel et al. |
| 2013/0019314 | A1 | 1/2013 | Ji et al. |
| 2013/0125230 | A1 | 5/2013 | Koponen et al. |
| 2013/0174168 | A1 | 7/2013 | Abuelsaad et al. |
| 2013/0266019 | A1 | 10/2013 | Qu et al. |
| 2013/0283339 | A1 | 10/2013 | Biswas et al. |
| 2014/0036730 | A1 | 2/2014 | Nellikar et al. |
| 2014/0129690 | A1 | 5/2014 | Jaisinghani et al. |
| 2014/0164897 | A1 | 6/2014 | Yucel et al. |
| 2014/0223556 | A1 | 8/2014 | Bignon et al. |
| 2014/0237100 | A1 | 8/2014 | Cohn et al. |
| 2014/0258479 | A1 | 9/2014 | Tenginakai et al. |
| 2015/0063166 | A1 | 3/2015 | Sif et al. |
| 2015/0081767 | A1 | 3/2015 | Evens |
| 2015/0100704 | A1 | 4/2015 | Davie et al. |
| 2015/0222598 | A1 | 8/2015 | Koponen et al. |
| 2015/0249574 | A1 | 9/2015 | Zhang |
| 2015/0263899 | A1 | 9/2015 | Tubaltsev et al. |
| 2015/0263946 | A1 | 9/2015 | Tubaltsev et al. |
| 2015/0317169 | A1 | 11/2015 | Sinha et al. |
| 2015/0348044 | A1 | 12/2015 | Smith |
| 2015/0379281 | A1 | 12/2015 | Feroz et al. |
| 2016/0036860 | A1 | 2/2016 | Xing et al. |
| 2016/0080422 | A1 | 3/2016 | Belgodere et al. |
| 2016/0094454 | A1 | 3/2016 | Jain et al. |
| 2016/0094457 | A1 | 3/2016 | Jain et al. |
| 2016/0094650 | A1 | 3/2016 | Rio |
| 2016/0094661 | A1 | 3/2016 | Jain et al. |
| 2016/0182293 | A1 | 6/2016 | Benedetto et al. |
| 2016/0217301 | A1 | 7/2016 | Watanabe et al. |
| 2016/0239326 | A1 | 8/2016 | Kaplan et al. |
| 2016/0241436 | A1 | 8/2016 | Fourie et al. |
| 2016/0254964 | A1 | 9/2016 | Benc |
| 2016/0269318 | A1 | 9/2016 | Su et al. |
| 2016/0294612 | A1 | 10/2016 | Ravinoothala et al. |
| 2016/0315809 | A1 | 10/2016 | McMurry et al. |
| 2016/0335129 | A1 | 11/2016 | Behera et al. |
| 2016/0337334 | A1 | 11/2016 | Murr |
| 2017/0005923 | A1 | 1/2017 | Babakian |
| 2017/0005986 | A1 | 1/2017 | Bansal et al. |
| 2017/0031956 | A1 | 2/2017 | Burk et al. |
| 2017/0063632 | A1 | 3/2017 | Goliya et al. |
| 2017/0063782 | A1 | 3/2017 | Jain et al. |
| 2017/0085561 | A1 | 3/2017 | Han et al. |
| 2017/0093790 | A1 | 3/2017 | Banerjee et al. |
| 2017/0171144 | A1 | 6/2017 | Sagiraju et al. |
| 2017/0177394 | A1 | 6/2017 | Barzik et al. |
| 2017/0195210 | A1 | 7/2017 | Jacob et al. |
| 2017/0206034 | A1 | 7/2017 | Fetik |
| 2017/0207963 | A1 | 7/2017 | Mehta et al. |
| 2017/0286698 | A1 | 10/2017 | Shetty et al. |
| 2017/0317954 | A1 | 11/2017 | Masurekar et al. |
| 2017/0332307 | A1 | 11/2017 | Pan |
| 2017/0353351 | A1 | 12/2017 | Cheng et al. |
| 2017/0366416 | A1 | 12/2017 | Beecham et al. |
| 2017/0374106 | A1 | 12/2017 | Hamou et al. |
| 2018/0019969 | A1 * | 1/2018 | Murthy .............. H04L 61/5007 |
| 2018/0063194 | A1 | 3/2018 | Vaidya et al. |
| 2018/0083835 | A1 | 3/2018 | Cole et al. |
| 2018/0089299 | A1 | 3/2018 | Collins et al. |
| 2018/0114012 | A1 | 4/2018 | Sood et al. |
| 2018/0123943 | A1 | 5/2018 | Lee et al. |
| 2018/0131675 | A1 | 5/2018 | Sengupta et al. |
| 2018/0167453 | A1 | 6/2018 | Luo |
| 2018/0167487 | A1 | 6/2018 | Vyas et al. |
| 2018/0183757 | A1 | 6/2018 | Gunda et al. |
| 2018/0205605 | A1 | 7/2018 | Mittal et al. |
| 2018/0234459 | A1 | 8/2018 | Kung et al. |
| 2018/0248827 | A1 | 8/2018 | Scharber et al. |
| 2018/0262424 | A1 | 9/2018 | Roeland et al. |
| 2018/0287996 | A1 | 10/2018 | Tripathy et al. |
| 2018/0295036 | A1 | 10/2018 | Krishnamurthy et al. |
| 2018/0331885 | A1 | 11/2018 | Raymond et al. |
| 2018/0359323 | A1 | 12/2018 | Madden |
| 2019/0034237 | A1 | 1/2019 | Siddappa et al. |
| 2019/0036868 | A1 | 1/2019 | Chandrashekhar et al. |
| 2019/0042518 | A1 | 2/2019 | Marolia et al. |

(56) References Cited

U.S. PATENT DOCUMENTS

| | | |
|---|---|---|
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0229987 A1 | 7/2019 | Shelke et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1* | 10/2021 | Zhou .................. G06F 9/54 |
| 2021/0328858 A1* | 10/2021 | Asveren ............ G06F 9/45558 |
| 2021/0349765 A1 | 11/2021 | Zhou et al. |
| 2021/0352044 A1* | 11/2021 | Asveren ................ H04L 47/20 |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1* | 6/2022 | Pillareddy ............ H04L 45/745 |
| 2022/0278926 A1 | 9/2022 | Sharma et al. |
| 2022/0311738 A1* | 9/2022 | Singh .................. H04L 61/5061 |
| 2022/0321495 A1 | 10/2022 | Liu et al. |
| 2022/0400053 A1* | 12/2022 | Liu ..................... H04L 41/0876 |
| 2023/0070224 A1 | 3/2023 | Huo et al. |
| 2023/0179484 A1 | 6/2023 | Liu et al. |
| 2023/0231827 A1* | 7/2023 | Tang .................. G06F 9/45558 |
| | | 709/245 |

FOREIGN PATENT DOCUMENTS

| | | |
|---|---|---|
| CN | 105897946 A | 8/2016 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| JP | 2011070707 A | 4/2011 |
| JP | 2012099048 A | 5/2012 |
| JP | 2018523932 A | 8/2018 |
| WO | 2011159842 A2 | 12/2011 |
| WO | 2016160523 A1 | 10/2016 |
| WO | 2018044352 A1 | 3/2018 |
| WO | 2019241086 A1 | 12/2019 |
| WO | 2020041073 A1 | 2/2020 |
| WO | 2021196080 A1 | 10/2021 |
| WO | 2022026028 A1 | 2/2022 |
| WO | 2022204941 A9 | 10/2022 |

OTHER PUBLICATIONS

Abwnawar, Nasser, "A Policy-Based Management Approach to Security in Cloud Systems," Feb. 2020, 184 pages, De Monfort University, Leicester, UK.

Author Unknown, "Advanced Networking Features in Kubernetes and Container Bare Metal," Document 606835-001, Dec. 2018, 42 pages, Intel Corporation.

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Author Unknown, "NSX vSphere API Guide—NSX 6.2 for vSphere," Jan. 6, 2017, 400 pages, VMware, Inc.

Author Unknown, "OpenShift Container Platform 4.6," Mar. 3, 2021, 41 pages, Red Hat, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

(56) References Cited

OTHER PUBLICATIONS

Non-published Commonly Owned U.S. Appl. No. 17/684,160, filed Mar. 1, 2022, 40 pages, VMware, Inc.
Non-published Commonly Owned U.S. Appl. No. 17/684,169, filed Mar. 1, 2022, 41 pages, VMware, Inc.
Non-published Commonly Owned U.S. Appl. No. 17/696,366, filed Mar. 16, 2022, 27 pages, VMware, Inc.
Non-published Commonly Owned U.S. Appl. No. 17/724,433, filed Apr. 19, 2022, 51 pages, VMware, Inc.
Non-published Commonly Owned U.S. Appl. No. 17/724,436, filed Apr. 19, 2022, 51 pages, VMware, Inc.
Non-Published Commonly Owned U.S. Appl. No. 17/960,126, filed Oct. 4, 2022, 28 pages, VMware, Inc.
Non-Published Commonly Owned U.S. Appl. No. 18/098,071, filed Jan. 17, 2023, 88 pages, VMware, Inc.
Non-Published Commonly Owned U.S. Appl. No. 18/098,072, filed Jan. 17, 2023, 87 pages, VMware, Inc.
Non-Published Commonly Owned U.S. Appl. No. 18/098,076, filed Jan. 17, 2023, 88 pages, VMware, Inc.
Non-Published Commonly Owned U.S. Appl. No. 18/098,078, filed Jan. 17, 2023, 87 pages, VMware, Inc.
Non-Published Commonly Owned U.S. Appl. No. 18/102,700, filed Jan. 28, 2023, 39 pages, VMware, Inc.
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Rouse, Margaret, "What is SDDC (software-defined data center)?—Definition from WhatIs.com," Mar. 2017, 5 pages, TechTarget.com.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Non-Published Commonly Owned U.S. Appl. No. 18/211,360, filed Jun. 19, 2023, 41 pages, VMware, Inc.

* cited by examiner

Stateful Set API    500

```
apiVersion: apps/v1
kind: StatefulSet
metadata:
  name: web
spec:
  selector:
    matchLabels:
      app: nginx
  serviceName: "nginx:
  replicas: 3
  template:
    metadata:
      labels:
        app: nginx
      annotations:
        ncp/ip_range: 192.168.0.10-192.168.0.50
      spec:
        containers:
        - name: nginx
          image: k8s.gcr.io.nginx-slim
          ports:
          - containerPort: 80
            name: web
```

*Figure 5*

ASSIGNING STATEFUL PODS FIXED IP ADDRESSES DEPENDING ON UNIQUE POD IDENTITY

BACKGROUND

StatefulSet endpoint machines (e.g., pods, containers, virtual machines) deployed for stateful applications maintain a "sticky" identity, which includes an ordinal index, a stable network identity, and a stable storage. However, StatefulSet endpoint machines currently do not maintain Internet Protocol (IP) addresses in the event of failure, removal, migration, etc. Hence, methods and systems are needed for assigning "sticky" IP addresses to StatefulSet endpoint machines.

BRIEF SUMMARY

Some embodiments provide a novel method for resiliently associating Internet Protocol (IP) addresses with pods that each have unique identifiers (IDs) in a managed cluster of worker nodes managed by a first set of one or more controllers of the managed cluster. The resilient association between IP addresses and pods is maintained even when pods are moved between worker nodes. At a second set of controllers, the method receives notification regarding deployment, on a first worker node, of a stateful pod associated with a particular ID. The method allocates an IP address to the stateful pod. The method creates a mapping between the IP address and the particular ID in order to maintain the allocation of the IP address to the stateful pod. Doing so ensures that when the particular stateful pod migrates from the first worker node to a second worker node of the managed cluster, the particular IP address continues to be assigned to the stateful pod. The method provides the IP address to the first set of controllers to use for the stateful pod.

In some embodiments, the particular stateful pod is a part of a set of stateful pods deployed for a stateful application, such as for a web server application, application server application, or a database server application, referred to as a StatefulSet. The first deployed pod in the cluster is in some embodiments a primary pod for the cluster, and all other pods are secondary pods. For instance, for a web server application, the primary pod handles both read and write requests, while the secondary pods only handle read requests. Because not all pods are identical in such embodiments, data is replicated for each secondary pod in order to maintain the same data stored for each pod. Pods can also be referred to as endpoint machines, endpoints, containers, VMs, etc.

The second set of controllers in some embodiments includes local controllers deployed in the managed cluster by a third set of controllers operating outside of the managed cluster. The third set of controllers configures the second set of controllers to perform the receiving, allocating, creating, and providing. The first and second sets of controllers may operate at a first site with the managed cluster while the third set of controllers operates at a second site. In such embodiments, the first set of controllers is provided by a first vendor while the third set of controllers is provided by a second vendor, and the third set of controllers enables features that are natively deficient in the managed cluster as managed by the first set of controllers. These features are enabled by the third set of controllers through the second set of controllers.

In some embodiments, the first set of controllers is a Kubernetes set of master nodes for the managed cluster, and the third set of controllers is a set of software defined network (SDN) controllers that are not Kubernetes controllers. In such embodiments, the second set of controllers include a network controller plugin (NCP) and/or an adapter and a controller deployed on one or more master nodes for the SDN controllers. For example, allocating IP addresses to stateful pods based on pod identity is not native to the managed cluster, so the third set of controllers provides this functionality through the second set of controllers.

Before receiving notification regarding deployment of the particular pod, the method of some embodiments includes receiving notification regarding deployment of a set of stateful pods including the particular stateful pod, requesting an IP address range from the third set of controllers, and receiving the IP address range from the third set of controllers. In some embodiments, the second set of controllers is notified that the StatefulSet has been created but before any pods have been deployed. The particular IP address is be allocated from this IP address range. The IP address range may include a range of IP addresses for assignment to the stateful pods in the set of stateful pods. In some embodiments, the range is restricted to a subnet configured for a namespace of the set of stateful pods, meaning that the range cannot include IP addresses that are out of the namespace subnet or across namespace subnets. If a range specified for the set of stateful pods includes network addresses not in the namespace subnet, the method of some embodiments sends an error notification to notifying of an invalid IP address range.

In some embodiments, the first set of controllers assigns a unique ID to each stateful pod in the set. The unique ID for each stateful pod includes (1) an ordinal index specifying an order of the stateful pod in which it is to be deployed, (2) a stable network identity specifying a name of the set of stateful pods and the ordinal index, and (3) a stable storage specifying a persistent volume claim of provisioned storage allocated to the stateful pod. An ordinal index specifies the order in which the stateful pod is deployed, and is an integer value from zero to one minus the number of stateful pods in the set. For example, the first deployed pod is assigned an ordinal index of 0, the second deployed pod is assigned an ordinal index of 1, and so on. If there are five pod in the stateful set to be deployed, the last deployed pod is assigned an ordinal index of 4. The stable network identity specifies the name of the stateful pod set and the ordinal index of the pod. Using the example above, if the first pod is part of a stateful set named "web" for a web server application, the first pod's stable network identity is "web-0." The stable storage specifies a persistent volume claim of provisioned storage allocated to the pod. In some embodiments, the administrator allocates a persistent volume claim and a persistent volume to each pod to be deployed for the stateful set.

Each stateful pod of a set of stateful pods is assigned a sequential IP address from the IP address range according to their associated unique ID, such that a first deployed stateful pod is assigned a first IP address from the IP address range and a second deployed stateful pod is assigned a subsequent, second IP address from the IP address range. In doing so, because each pod's identity remains unchanged, and because the mapping is maintained, even in the event of pod failure or migration, the pod's IP address is able to remain the same. This provides many benefits, such as being able to specify network policies (e.g., middlebox service policies and rules) for individual pods in the stateful set without having to make any updates to their IP addresses or to the network policies.

After allocating the particular IP address to the particular stateful pod, the second set of controllers of some embodiments use the particular IP address to define one or more service policies to enforce on data messages associated with the particular stateful pod. In other embodiments, the second set of controllers provides the particular IP address to the first set of controllers for the first set of controllers to define one or more service policies to enforce on data messages associated with the particular stateful pod. Still, in other embodiments, the second set of controllers provides the particular IP address to the third set of controllers for the third set of controllers to define one or more service policies to enforce on data messages associated with the particular stateful pod. In these embodiments, the managed cluster is a first managed cluster and the data messages are also associated with one or more pods deployed in a second managed cluster managed by a fourth set of one or more controllers. As discussed previously, the third set of controllers is a set of SDN controllers that provides functionalities for the first managed cluster managed by the first set of controllers. The third set of controllers also provides these functionalities to the second managed cluster, and because the first and second managed clusters do not have full visibility of each other, the third set of controllers uses IP addresses from both managed clusters to define network policies to enforce on data messages exchanged between the managed clusters.

In some embodiments, the notification regarding the deployment of the particular stateful pod is a first notification, and the method further includes receiving a second notification that the particular pod has migrated from the first worker node to the second worker node. Alternatively, the method may receive a second notification that the particular stateful pod has failed and restarted on the first worker node. In both of these embodiments, the second set of controllers provides the particular IP address to the first set of controllers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 5 illustrates an example of a StatefulSet API.

DETAILED DESCRIPTION

Figure 1:
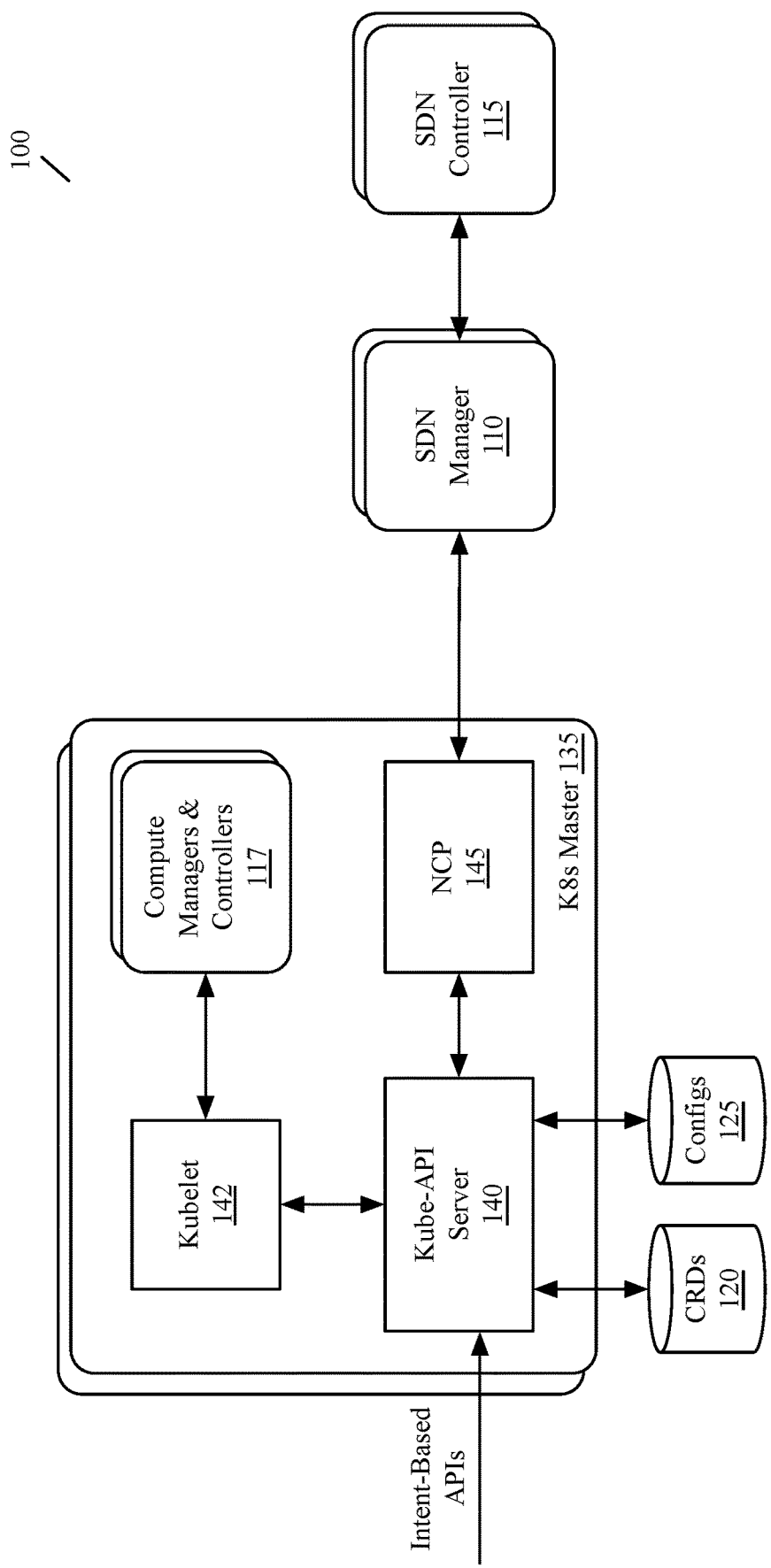
FIG. 1 illustrates an example of a control system of some embodiments of the invention that processes APIs.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for resiliently associating Internet Protocol (IP) addresses with pods that each have unique identifiers (IDs) in a managed cluster of worker nodes managed by a first set of one or more controllers of the managed cluster. The resilient association between IP addresses and pods is maintained even when pods are moved between worker nodes. At a second set of controllers, the method receives notification regarding deployment, on a first worker node, of a stateful pod associated with a particular ID. The method allocates an IP address to the stateful pod. The method creates a mapping between the IP address and the particular ID in order to maintain the allocation of the IP address to the stateful pod. Doing so ensures that when the particular stateful pod migrates from the first worker node to a second worker node of the managed cluster, the particular IP address continues to be assigned to the stateful pod. The method provides the IP address to the first set of controllers to use for the stateful pod.

In some embodiments, the particular stateful pod is a part of a set of stateful pods deployed for a stateful application, such as for a web server application, application server application, or a database server application, referred to as a StatefulSet. The first deployed pod in the cluster is in some embodiments a primary pod for the cluster, and all other pods are secondary pods. For instance, for a web server application, the primary pod handles both read and write requests, while the secondary pods only handle read requests. Because not all pods are identical in such embodiments, data is replicated for each secondary pod in order to maintain the same data stored for each pod. Pods can also be referred to as endpoint machines, endpoints, containers, VMs, etc.

The second set of controllers in some embodiments includes local controllers deployed in the managed cluster by a third set of controllers operating outside of the managed cluster. The third set of controllers configures the second set of controllers to perform the receiving, allocating, creating, and providing. The first and second sets of controllers may operate at a first site with the managed cluster while the third set of controllers operates at a second site. In such embodiments, the first set of controllers is provided by a first vendor while the third set of controllers is provided by a second vendor, and the third set of controllers enables features that are natively deficient in the managed cluster as managed by the first set of controllers. These features are enabled by the third set of controllers through the second set of controllers.

In some embodiments, the first set of controllers is a Kubernetes set of master nodes for the managed cluster, and the third set of controllers is a set of software defined network (SDN) controllers that are not Kubernetes controllers. In such embodiments, the second set of controllers include a network controller plugin (NCP) and/or an adapter and a controller deployed on one or more master nodes for the SDN controllers. For example, allocating IP addresses to stateful pods based on pod identity is not native to the managed cluster, so the third set of controllers provides this functionality through the second set of controllers and using custom resource definitions (CRDs).

Before receiving notification regarding deployment of the particular pod, the method of some embodiments includes receiving notification regarding deployment of a set of stateful pods including the particular stateful pod, requesting an IP address range from the third set of controllers, and receiving the IP address range from the third set of controllers. In some embodiments, the second set of controllers is notified that the StatefulSet has been created but before any pods have been deployed. The particular IP address is be allocated from this IP address range. The IP address range may include a range of IP addresses for assignment to the stateful pods in the set of stateful pods. In some embodiments, the range is restricted to a subnet configured for a namespace of the set of stateful pods, meaning that the range cannot include IP addresses that are out of the namespace subnet or across namespace subnets. If a range specified for the set of stateful pods includes network addresses not in the namespace subnet, the method of some embodiments sends an error notification to notifying of an invalid IP address range.

A stateful pod, as described throughout this Specification, is an endpoint machine deployed on a node, such as a host computer. An endpoint machine can be a virtual machine (VM), a pod, a container, etc. An endpoint is defined as a source or destination machine, such that endpoints are the starting and ending machines of a data message flow. A VM, a container, or a pod can be these source and destination endpoint machines at the start or end of a data message flow. These machines can be referred to as nodes, machines, data compute nodes, etc. Throughout this specification, pods, stateful pods, and endpoints are terms that will be used, however, the embodiments described herein are not limited to only pods or endpoints.

Many of the embodiments described herein are described in relation to a Kubernetes system, sometimes abbreviated "Kubes" or "K8s". However, one of ordinary skill in the art will understand that this is merely one example of a network system that embodies the inventions described herein and that other embodiments of the invention may apply to other network systems and container network systems. In the Kubernetes system, a container is an immutable (i.e., cannot be changed once it starts running), lightweight executable image that contains software (also referred to as the container runtime) and all of its dependencies (e.g., libraries, etc.) required for running an application. The containers decouple the applications from the underlying host infrastructure, thereby simplifying deployment. Examples of container runtimes that are supported by Kubernetes include Docker, containerd, CRI-O, and the Kubernetes Container Runtime Interface (CRI).

In some embodiments, a container is executed as a set of one or more containers. In some such embodiments, each set of containers may execute within a respective pod. In a Kubernetes system, a pod is the smallest deployable unit that can be created (e.g., by a user), and acts as a logical host by containing the set of one or more tightly-coupled containers. Each pod includes storage and network resources (e.g., ports for communications external to the pod) to be shared by the containers executing in the pod, as well as a specification for how to run those containers. In some embodiments, the contents of a pod are always stored together and executed together. In addition to the templates and code that is supplied by the original programmers of the Kubernetes system, the system allows a user to create customized resources. The network control system of some embodiments processes one or more CRDs that define attributes of custom-specified network resources. The CRDs define extensions to the Kubernetes networking requirements.

Each pod, in some embodiments, is assigned a static IP address that is then stored in a configuration file of the pod. In some embodiments, a pod may be migrated from one pod to another pod. In some such embodiments, the static IP address assigned to the pod is maintained during the migration. Each namespace, in some embodiments, is assigned a set of IP addresses, and the static IP addresses assigned to the pods are provided from the set of IP addresses assigned to the pod's respective namespace. In some embodiments, the set of IP addresses may include a different number of IP addresses. For instance, the first namespace is assigned a different number of IP addresses than the second namespace, in some embodiments.

In some embodiments, the worker node executes on a host computer that includes a NIC (network interface card) for exchanging data with elements (e.g., other host computers, compute nodes, forwarding elements, etc.) external to the host computer. In some such embodiments, data sent from any of the sets of containers executing on the worker node to an element external to the host computer would be sent through the virtual Ethernet interface associated with the source set of containers, through the gateway interface, and through the NIC of the host computers. The worker node, in some embodiments, is one of multiple worker nodes executing on the host computer, along with a software switch that includes ports for forwarding data between interfaces of the worker nodes, as well as between these worker node interfaces and the NIC of the host computer (i.e., for sending data to a destination external to the host computer, such as a node executing on a different host computer).

In some embodiments, the control system includes a network controller plugin (NCP) for receiving parsed Application Programming Interface requests (APIs) from the API server and generating the API calls using one of the structures described above. Also, rather than including an NCP, the control system of some embodiments instead includes an adapter to receive the parsed APIs from the API server and generate the API calls, as will be discussed further below by reference to FIGS. 1 and 2.

FIG. 1 illustrates an example of a control system 100 of some embodiments of the invention that processes APIs that use the Kubernetes-based declarative model to describe the desired state of (1) the endpoints to deploy, and (2) the connectivity, security and service operations that are to be performed for the deployed endpoints (e.g., private and public IP addresses connectivity, load balancing, security policies, etc.). To process the APIs, the control system 100 uses one or more CRDs to define some of the resources referenced in the APIs. The system 100 performs automated processes to deploy a logical network that connects the deployed endpoints and segregates these endpoints from other endpoints in the datacenter set. The endpoints are connected to the deployed logical network of a virtual private cloud (VPC) in some embodiments. In some embodiments, the control system 100 instead processes APIs that reference the CRDs.

As shown, the control system 100 includes two or more master nodes 135 for API processing, an SDN manager cluster 110, and an SDN controller cluster 115. Each of the master nodes 135 for API processing includes an API processing server 140, a kubelet 142 node agent, compute managers and controllers 117, and an NCP 145. The API processing server 140 receives intent-based API calls and parses these calls. In some embodiments, the received API calls are in a declarative, hierarchical Kubernetes format, and may contain multiple different requests.

The API processing server 140 parses each received intent-based API request into one or more individual requests. When the requests relate to the deployment of endpoints, the API server provides these requests directly to compute managers and controllers 117, or indirectly provides these requests to the compute managers and controllers 117 through the kubelet 142 and/or the NCP 145 running on the Kubernetes master node 135. The compute managers and controllers 117 then deploy VMs and/or sets of containers on host computers in the availability zone.

The kubelet 142 node agent on a node can register the node with the API server 140 using one of: the hostname; a flag to override the hostname; or specific logic for a cloud provider. The kubelet 142 receives sets of containerspecs, YAML (a data serialization language) or JavaScript Object Notation (JSON) formatted objects that each describe a pod. The kubelet 142 uses sets of containerspecs to create (e.g., using the compute managers and controllers 117) the sets of containers that are provided by various mechanism elements (e.g., from the API server 140) and ensures that the containers described in those sets of containerspecs are running and healthy.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default.

In some embodiments, the API calls refer to extended resources that are not defined per se by the baseline Kubernetes system. For these references, the API processing server 140 uses one or more CRDs 120 to interpret the references in the API calls to the extended resources. The CRDs in some embodiments define extensions to the Kubernetes networking requirements. In some embodiments, the CRDs can include network-attachment-definition (NDs), Virtual Network Interfaces (VIF) CRDs, Virtual Network CRDs, Endpoint Group CRDs, security CRDs, Virtual Service Object (VSO) CRDs, and Load Balancer CRDs. In some embodiments, the CRDs are provided to the API processing server 140 in one stream with the API calls.

NCP 145 is the interface between the API server 140 and the SDN manager cluster 110 that manages the network elements that serve as the forwarding elements (e.g., switches, routers, bridges, etc.) and service elements (e.g., firewalls, load balancers, etc.) in an availability zone. The SDN manager cluster 110 directs the SDN controller cluster 115 to configure the network elements to implement the desired forwarding elements and/or service elements (e.g., logical forwarding elements and logical service elements) of one or more logical networks. The SDN controller cluster 115 interacts with local controllers on host computers and edge gateways to configure the network elements in some embodiments.

In some embodiments, NCP 145 registers for event notifications with the API server 140, e.g., sets up a long-pull session with the API server to receive all CRUD (Create, Read, Update and Delete) events for various CRDs that are defined for networking. In some embodiments, the API server 140 is a Kubernetes master VM, and the NCP 145 runs in this VM as a Pod. NCP 145 in some embodiments collects realization data from the SDN resources for the CRDs and provides this realization data as it relates to the CRD status. In some embodiments, the NCP 145 communicates directly with the API server 140 and/or through the kubelet 142.

In some embodiments, NCP 145 processes the parsed API requests relating to NDs, VIFs, virtual networks, load balancers, endpoint groups, security policies, and VSOs to direct the SDN manager cluster 110 to implement (1) the NDs that designate network segments for use with secondary interfaces of sets of containers, (2) the VIFs needed to connect VMs and sets of containers to forwarding elements on host computers, (3) virtual networks to implement different segments of a logical network of the VPC, (4) load balancers to distribute the traffic load to endpoint machines, (5) firewalls to implement security and admin policies, and (6) exposed ports to access services provided by a set of endpoints in the VPC to endpoints outside and inside of the VPC. In some embodiments, rather than directing the manager cluster 110 to implement the NDs, VIFs, virtual networks, load balancers, endpoint groups, security policies, and VSOs, the NCP 145 in some embodiments communicates directly with the SDN controller cluster 115 to direct the controller cluster 115 to implement the NDs, VIFs, virtual networks, load balancers, endpoint groups, security policies, and VSOs.

The API server 140 provides the CRDs 120 that have been defined for these extended network constructs to the NCP 145 for it to process the APIs that refer to the corresponding network constructs (e.g., network segments). The API server 140 also provides configuration data from the configuration storage 125 to the NCP 145. The configuration data in some embodiments include parameters that adjust the pre-defined template rules that the NCP 145 follows to perform its automated processes. In some embodiments, the configuration data includes a configuration map. The configuration map of some embodiments may be generated from one or more directories, files, or literal values. In some embodiments, the configuration map is generated from files in the configuration storage 125, from data received by the API server from the NCP and/or from data generated by the SDN manager 110. The configuration map in some embodiments includes identifiers of pre-created network segments of the logical network.

The NCP 145 performs these automated processes to execute the received API requests in order to direct the SDN manager cluster 110 to deploy the network elements for the VPC. For a received API, the control system 100 performs one or more automated processes to identify and deploy one or more network elements that are used to implement the logical network for a VPC. The control system performs these automated processes without an administrator performing any action to direct the identification and deployment of the network elements after an API request is received.

The SDN managers 110 and controllers 115 can be any SDN managers and controllers available today. In some embodiments, these managers and controllers are the NSX-T managers and controllers licensed by VMware, Inc. In such embodiments, NCP 145 detects network events by processing the data supplied by its corresponding API server 140, and uses NSX-T APIs to direct the NSX-T manager 110 to deploy and/or modify NSX-T network constructs needed to implement the network state expressed by the API calls. The communication between the NCP and NSX-T manager 110 is asynchronous communication, in which the NCP provides the desired state to NSX-T managers, which then relay the desired state to the NSX-T controllers to compute and disseminate the state asynchronously to the host computer, forwarding elements and service nodes in the availability zone (i.e., to the software defined datacenter (SDDC) set controlled by the controllers 115).

After receiving the APIs from the NCPs 145, the SDN managers 110 in some embodiments direct the SDN controllers 115 to configure the network elements to implement the network state expressed by the API calls. In some embodiments, the SDN controllers serve as the central control plane (CCP) of the control system 100.

Figure 2:
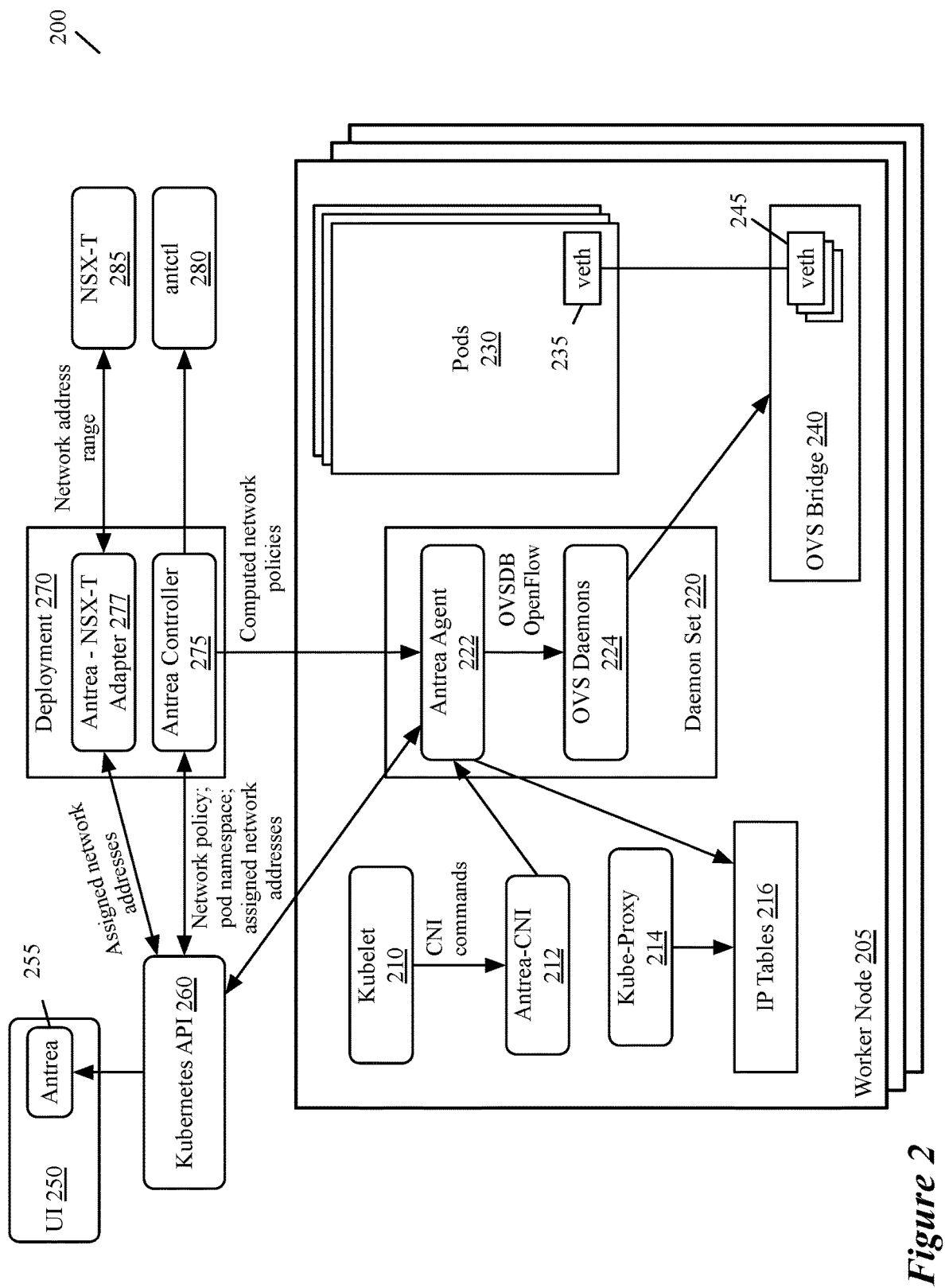
FIG. 2 illustrates an Antrea networking solution of some embodiments.

FIG. 2 illustrates an Antrea networking solution of some embodiments, which is a specific implementation for Kubernetes that works with NSX-T, a specific environment for a specific commercially available product of VMware, inc. As a Kubernetes networking solution, Antrea implements the Container Network Interface (CNI), while Kubernetes NetworkPolicy operates at Layer 3/4 (L3/L4) to provide network connectivity and security services for a Kubernetes cluster (i.e., collection of nodes for running containerized applications), leveraging the benefit of programmable networks from Open vSwitch (OVS) to Kubernetes. OVS is a widely adopted high-performance programmable virtual switch, originating from VMware, Inc., that is designed to enable effective network automation through programmatic extensions. The Antrea network solution described herein leverages OVS in its architecture to efficiently implement pod networking and security features.

In some embodiments, because of the programmable OVS, forwarding functions are opened to programmatic extension and control. Based on this, a new flexible Antrea IPAM (host-local IP address management) plugin overrides and extends the existing flow tables, which are managed by a new centralized CRD instead of a local store IP management state from the original host-local IPAM plugin. This centralized controller helps to provide the ability of multiple networks on a pod and IPAM per-namespace, according to some embodiments. In some embodiments, in an L3 forwarding table, all traffic destined to a remote pod is forwarded through the appropriate tunnel, and for the return flow from a remote pod to local node, a distinction must be drawn between the remote gateway and the local gateway, according to some embodiments.

As shown, the Antrea networking solution 200 includes Kubernetes nodes 205, a user interface (UI) 250 with an Antrea plugin 255, a Kubernetes API server 260, a deployment 270 that runs the Antrea controller 275 and an Antrea—NSX-T adapter 277, NSX-T manager and controller cluster 285, and Antrea command-line tool 280 (i.e., antctl 280). In some embodiments, the UI 250, Kubernetes API server 260, deployment 270, and Antrea command-line tool 280 execute together as part of the control plane on a single master node. Also, in some embodiments, the NSX-T manager and controller cluster 285 includes separate manager and controller clusters, such as the SDN manager cluster 110 and SDN controller cluster 115 described above.

To provide a more flexible IPAM (host-local IP address management) that is based on namespace isolation, the deployment 270 runs the Antrea controller 275, which is used along with corresponding CRDs (custom resource definitions) to manage all of the IP addresses for endpoints (e.g., pods) executing on nodes in the network. As a result, each pod subnet is associated with a respective namespace such that the IP assigned to a pod is related to its business, in some embodiments. Additionally, pods located under the same namespace are in the same local area network (LAN), in some embodiments, while pods under different namespaces are isolated on different networks. In some embodiments, a static IP address assigned to a pod can be configured by the annotation filed for the corresponding configuration file. Users (e.g., administrators) could also monitor the IP usage from the Antrea command-line tool 280 or the UI 250 in order to expand the corresponding IP resource pool in a timely manner when IP resources are exhausted, according to some embodiments.

The deployment 270 also runs the Antrea—NSX-T adapter 277, as shown. The Antrea—NSX-T adapter 277, in some embodiments, replaces the NCP 145 on the master node 135, as mentioned above. In some embodiments, the Antrea—NSX-T adapter 277 receives parsed API requests regarding deploying pods for a stateful application from the API server 260, and generates API calls to direct the NSX-T manager and controller cluster 285 to provide IP ranges to assign to the pods, according to some embodiments. Once an IP range has been received, the Antrea—NSX-T adapter 277 can allocate IP addresses from the range to the pods for the stateful application. In other embodiments, the deployment 270 communicates with NSX-T 285 through the Antrea controller 275 instead of the Antrea—NSX-T adapter 277 to request and receive network address ranges.

The UI 250 is used to manage Kubernetes clusters by translating human-readable commands into API calls that can be understood by the Kubernetes API server 260. In some embodiments, the UI 250 is a VMware Octant UI, and presents its output in a graphical user interface (GUI) for viewing by a user (e.g., administrator). The UI 250 runs locally on the user's workstation, according to some embodiments, and as a result, does not use up resources of the node or nodes that it manages. The UI 250 includes Antrea plugin 255 for receiving Antrea CRDs from the Kubernetes API server 260 to use by the Antrea plugin 255.

The Antrea controller 275 additionally monitors network policy, pod, namespace, and network address resources with the Kubernetes API 260. The Antrea controller 275, in some embodiments, uses information associated with these resources to compute policy rules, which can be translated to OVS flows efficiently and disseminated to a targeted Antrea agent (e.g., Antrea agent 222) that runs on a node along with one or more affected pods. The Kubernetes API server 260 enables different components of the Kubernetes cluster (i.e., a master node and set of one or more worker nodes) to communicate with each other and with components external to the cluster, according to some embodiments. Additionally, in some embodiments, the API server 260 enables users to query and alter the states of API objects, such as pods, namespaces, configuration maps, and events.

Each of the worker nodes 205 includes a kubelet 210 node agent, Antrea-CNI (container network interface) 212, kube-proxy 214, IP tables 216, daemonset 220, one or more pods 230, and an OVS bridge 240. The kubelet 210, in some embodiments, is responsible for registering the node 205 with the API server 260. Additionally, the kubelet 210 ensures that containers defined in pod specifications received from the API server 260 are both running and healthy. In some embodiments, instead of receiving the pod specifications from the API server 260, the kubelet 210 receives the pod specifications from an HTTP endpoint (not shown) or an HTTP server (not shown).

The daemonset 220 includes two containers to run the Antrea agent 222 and the OVS daemons 224, respectively, on every node, as well as an init-container (not shown) that installs the Antrea-CNI 212 on the node. The Antrea-CNI 212, in some embodiments, requests IP addresses for pods instantiated on the node 205, and interacts with the Antrea agent 222 to update the IP table 216 with the assigned IP addresses. The kube-proxy 214 runs on the node 205 to maintain network rules on the node to allow network communications to the pods 230 from sessions within the cluster, as well as sessions outside of the cluster. In some embodiments, the kube-proxy 214 forwards data traffic for the pods itself using the IP addresses in the IP table 216. In some embodiments, OVS realizes the data plane on each of the worker nodes 205 at the same time, and in response, the Antrea controller 275 implements the control plane of the SDN for which the Antrea networking solution 200 is implemented.

The Antrea agent 222 helps to bridge the Antrea controller 275 and OVS between the master node (not shown) and each other node 205 by creating the OVS bridge 240 and a veth pair for each pod 230, with one end 235 of the veth pair being in the pod's network namespace, and the other end 245 connected to the OVS bridge 240. As shown, the Antrea agent 222 interacts with the OVS bridge 240 via the OVS daemons 224. In some embodiments, on the OVS bridge 240, the Antrea agent 222 also creates an internal port antrea-gw0 (not shown) by default as the gateway of the node's subnet, and a tunnel port antrea-tun0 (not shown) for creating overlay tunnels to other nodes 205.

As discussed previously, an SDN control system may utilize an NCP to perform automated processes to allocate IP addresses to StatefulSet pods (also referred to as stateful pods) deployed in a Kubernetes networking system. StatefulSet is a Kubernetes controller to run stateful applications as containers (pods) in a Kubernetes cluster, such as for a web server application, application server application, or a database server application. In some embodiments, StatefulSet pods are assigned a unique "sticky" identity, such that each pod's identity remains unchanged regardless of whether it crashes and restarts, gets migrated to another node, etc. A pod identity (ID) includes an ordinal index, a stable network identity, and a stable storage. An ordinal index is an integer assigned to the pod indicating the order in which it is deployed in relation to the other pods in the StatefulSet. The range of the ordinal indexes for a StatefulSet is between 0 and N−1, N being the number of pods in the StatefulSet. For example, for a StatefulSet that includes three pods, the first instantiated pod is assigned an ordinal index of 0, the second instantiated pod is assigned an ordinal index of 1, and the third instantiated pod is assigned an ordinal index of 2. In some embodiments, each pod in a StatefulSet is assigned an IP address based on the pod's identity, such that the IP address does not change whether the pod crashes and restarts, whether it migrates to another node, etc.

A stable network identity for a given pod specifies the name of the StatefulSet and the ordinal index of the pod. Using the example above, if the StatefulSet is named "db" for a database server application, the first pod's stable network identity is "db-0." The stable storage specifies a persistent volume claim of provisioned storage allocated to the endpoint. In some embodiments, an administrator instantiating the StatefulSet gives each pod a single persistent volume with a storage class and 1 GiB of provisioned storage. Assigning a unique ID to each stateful pod in a StatefulSet provides guarantees about the ordering and uniqueness of the stateful pods. This is beneficial for application that require one or more of (1) stable, unique network identifiers, (2) stable, persistent storage, (3) ordered, graceful deployment and scaling, and (4) ordered, automated rolling updates.

Figure 3:
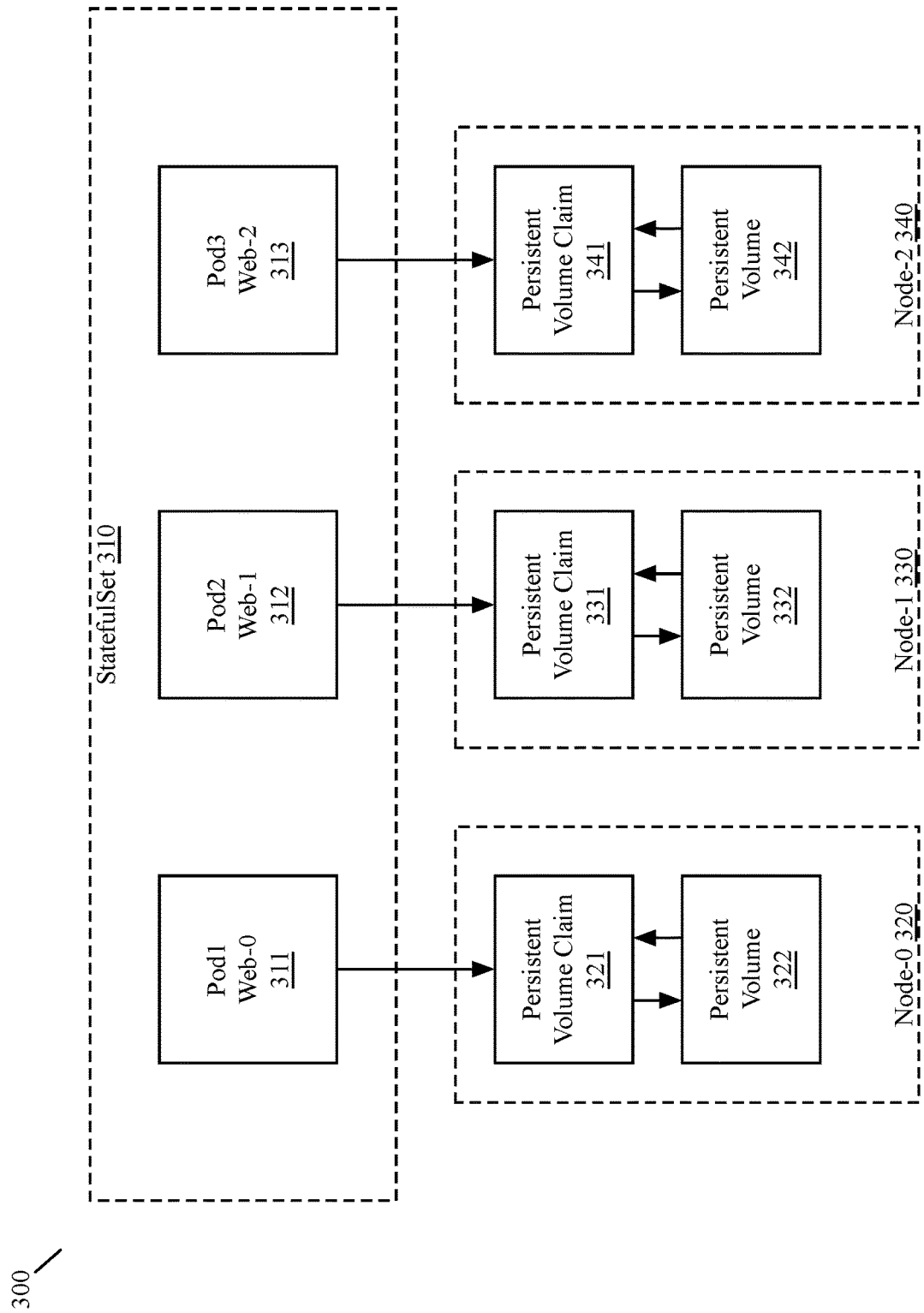
FIG. 3 illustrates an example system that implements a stateful application as a set of stateful pods.

FIG. 3 illustrates an example system 300 that implements a StatefulSet 310. This StatefulSet 310 is deployed using three endpoints, i.e., pods 311, 312, and 313, each instantiated on a worker node 320, 330, and 340. In some embodiments, the StatefulSet is instantiated by a Kubernetes system master node, such as the master nodes 135 of FIG. 1. For the StatefulSet 310, the first pod 311 is deployed first, and is, hence, assigned an ordinal index of 0. It's stable network identity is assigned "web-0". Pod 311 is deployed on a first worker node 320, and is assigned a persistent volume claim 321 and a persistent volume 322. The second pod 312, deployed second for the StatefulSet 310, is assigned the ordinal index 1 and the stable network identity "web-1." It is deployed on a second worker node 330, and is assigned a persistent volume claim 331 and a persistent volume 332. The third pod 313, deployed last for the StatefulSet 310, is assigned the ordinal index 2 and the stable network identity "web-2." It is deployed on a third worker node 340, and is assigned a persistent volume claim 341 and a persistent volume 342.

Figure 4:
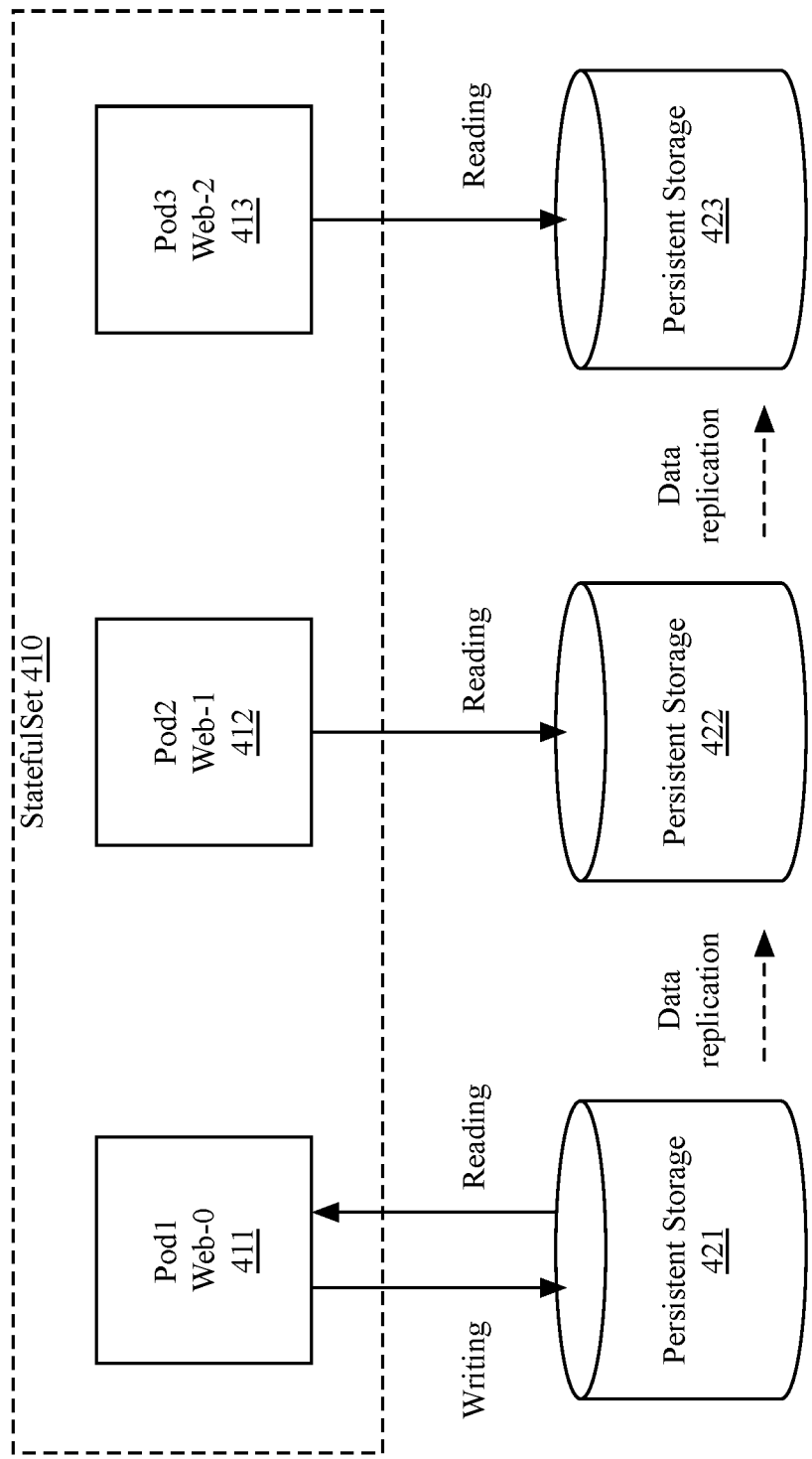
FIG. 4 illustrates an example system deploying a primary stateful pod and secondary stateful pods for a stateful application that handles read and write requests.

In some embodiments, StatefulSets are configured to include a primary pod and secondary pods (also referred to as replicas). The primary pod is the first instantiated pod, and all other instantiated pods are secondary pods. In such embodiments, the secondary pods do not perform the same operations as the primary pod, so each secondary pod performs data replication to maintain the same information. FIG. 4 illustrates this example for a StatefulSet 410. The StatefulSet 410 includes three pods, a primary pod 411, and secondary pods 412 and 413. In this example, the StatefulSet is an application for handling read and write requests. All pods 411, 412, and 413 handle read requests, as shown. However, only the primary pod 411 handles write requests. Because of this, the pods in the StatefulSet 410 only store the information regarding the operations they perform and the persistent storages 421-423 associated with the pods 411-413 are not identical. In order to alleviate this issue, data is synced between all persistent storages 421-423. By doing so, each pod stores the same information for the application, even though only the primary pod 421 handles write requests.

In order to deploy a StatefulSet in a Kubernetes system, a StatefulSet API request must be defined. FIG. 5 illustrates an example of a StatefulSet API request 500 that is specified in some embodiments. The API request 500 has a metadata attribute containing its name and spec. As shown, the StatefulSet named "web" is defined to include 3 replicas (i.e., 3 pods) for deploying the stateful application. An IP range is also defined in order to specify the range of IP addresses to assign to the pods of the StatefulSet. The annotation "ncp/ip_range" specifies the IP range, which in this case is from 192.168.0.10 to 192.168.10.50. The IP range annotation is provided by an NCP or adapter, which receives the IP range from the SDN manager system, and the Kubernetes master node adds the annotation to the API request. From this API request 500, a Kubernetes system is able to deploy the StatefulSet using IP addresses allocated to each pod by an NCP or adapter based on each pod's unique ID (e.g., its ordinal index).

Figure 6:
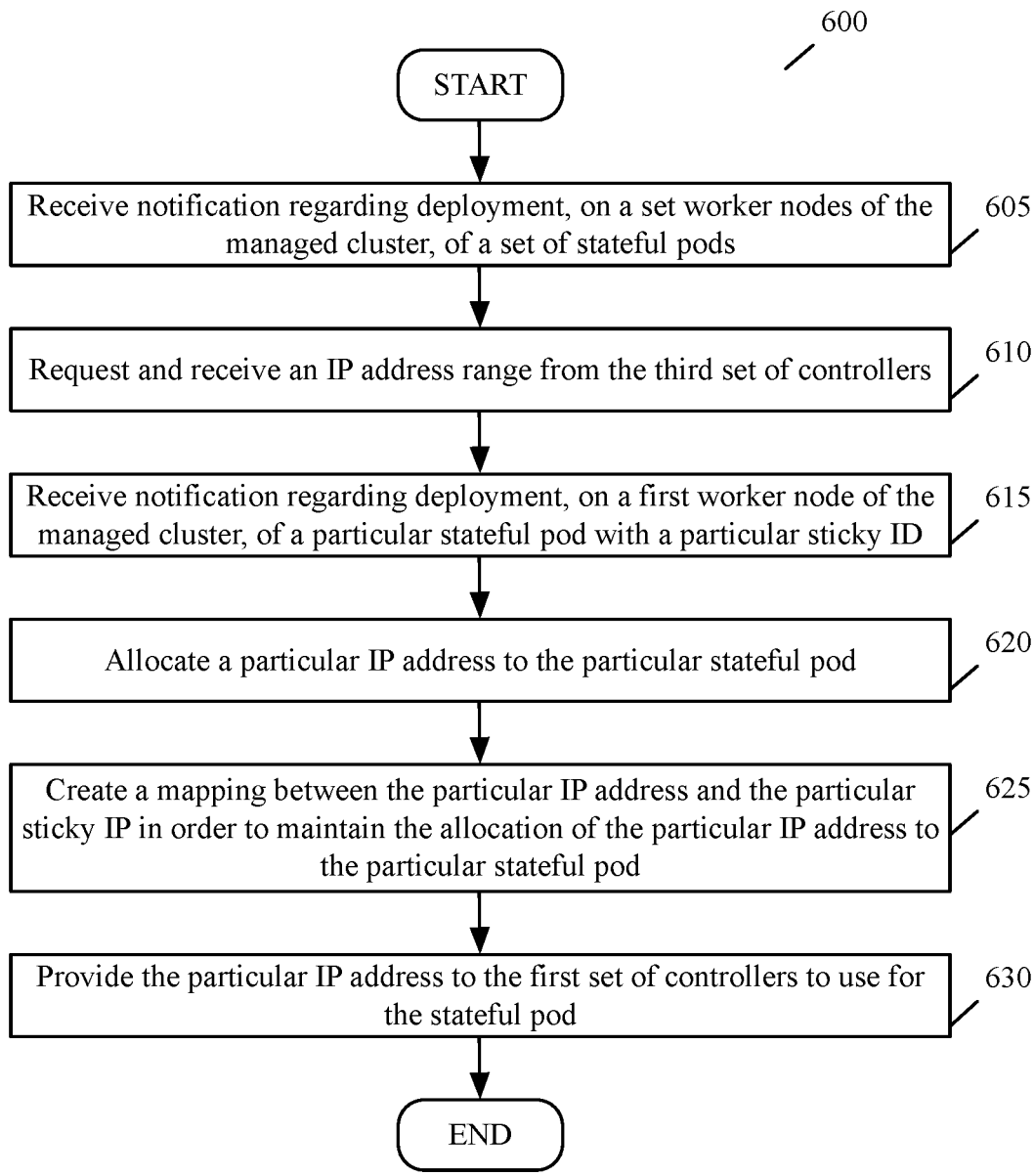
FIG. 6 conceptually illustrates a process of some embodiments for deploying stateful pods for a stateful application.

FIG. 6 conceptually illustrates a process 600 of some embodiments for resiliently associating IP addresses with pods that each have unique IDs in a managed cluster of worker nodes. In some embodiments, the managed cluster is managed by a first set of one or more controllers of the managed cluster, such as one or more master worker nodes managing other worker nodes of a Kubernetes cluster. The resilient association between the IP addresses and the pods is maintained even when pods are moved between worker nodes. The process 600 may be performed by a controller of a second set of controllers, such as by an NCP or an adapter in the managed cluster. In such embodiments, the NCP or adapter perform the process 600 by the direction of a third set of controllers (e.g., an SDN manager and controller) that provide the functionality of IP allocation to stateful pods to the managed cluster, which does not natively have this functionality. The first and second sets of controllers operate at a first site, while the third set of controllers operates at a second site. In such embodiments, the first set of controllers is provided by a first vendor while the third set of controllers is provided by a second vendor, and the third set of controllers enables features that are natively deficient in the managed cluster as managed by the first set of controllers. These features are enabled by the third set of controllers through the second set of controllers. Specifically, assigning fixed or resilient IP addresses to pods (e.g., stateful pods) is not a native functionality of the first set of controllers, so the third set of controllers assigns fixed IP addresses to pods through the second set of controllers.

As shown, the process 600 begins by receiving (at 605) notification regarding deployment, on a set of worker nodes of the managed cluster, of a set of stateful pods. The second set of controllers receives, from the first set of controllers, notification that a StatefulSet has been created. More specifically, the NCP or adapter receives from the Kube-API server notification regarding the creation of the StatefulSet. As discussed previously, an NCP can register for event notifications from a Kube-API server, such as event notifications regarding StatefulSets. The created StatefulSet in some embodiments is associated with a namespace that has a subnet allocated to it, such that all pods for the StatefulSet are within that namespace. In some embodiments, the first set of controllers provides an API request for deploying the StatefulSet to the second set of controllers. Notifying the second set of controllers of the StatefulSet creation lets the second set of controllers know IP addresses need to be allocated to each pod deployed for the StatefulSet.

After receiving notification regarding the set of stateful pods, the process 600 requests and receives (at 610) an IP address range from the third set of controllers. Based on the specified namespace and subnet, the NCP or adapter requests from the SDN manager system an IP address range within the subnet of the associated namespace. In some embodiments, the received range is restricted to a subnet configured for a namespace of the set of stateful pods, meaning that the range cannot include IP addresses that are out of the namespace subnet or across namespace subnets. If a received range specified for the set of stateful pods includes network addresses not in the namespace subnet, the some embodiments send an error notification to the SDN manager system or an administrator notifying of an invalid IP address range. In some embodiments, after receiving the IP address range from the third set of controllers, the second set of controllers provides the received IP address range in an annotation to the first set of controllers. In such embodiments, the second set of controllers provides the IP address range annotation to the Kube-API server, which adds the annotation to the API request. In other embodiments, this step is not performed.

Next, the process receives (at 615) notification regarding deployment, on a first worker node of the managed cluster, of a particular stateful pod associated with a particular ID in the first set of one or more controllers. In some embodiments, the second set of controllers is notified that it needs to allocate IP addresses from the IP range to stateful pods after the StatefulSet has been created but before any pods have been deployed. In other embodiments, the second set of controllers is notified after each pod is deployed. At 620, the process 600 allocates a particular IP address to the particular stateful pod. The particular IP address is selected from the IP address range based on the particular stateful pod's unique ID. Because StatefulSet pods are assigned a unique "sticky" identity, which does not change, assigning each stateful pod an IP address from the specified range based on their identity results in an unchanging IP address for each pod. This has many benefits.

For example, in some embodiments, IP addresses assigned to pods are used inside or outside the managed cluster, and the managed cluster does not want to tell all internal or external clients about any updated IP addresses of pods. By resiliently assigning IP addresses to these pods (i.e., by assigning fixed IP addresses to these pods), no updates to IP addresses need to be provided. As another example, legacy systems that are being onboarded to a cloud use IP addresses to identify services available in their legacy systems (e.g., on-premises systems), namely, some embodiments advertise service IP addresses instead of the service's name. Hence, it is more beneficial to assign resilient IP addresses rather than IP addresses that can change because all clients that access these services would have to be reconfigured. And, as another example, network policies can be defined for individual pods by specifying their IP addresses, rather than defining network policies based on a load balancing service IP address which provides data messages to the individual pods. Even if a pod crashes and has to restart, or if a pod moves from one worker node to another, its IP address will not change, and the network policies can specify and individual pods and do not need to be updated.

Then, the process 600 creates (at 625) a mapping between the particular IP address and the particular sticky ID in order to maintain the allocation of the particular IP address to the particular stateful pod. Doing so ensures that when the particular stateful pod migrates from the first worker node to a second worker node of the managed cluster, the particular IP address continues to be assigned to the stateful pod. It also ensures that upon failure of the particular stateful pod, the particular stateful pod can be restarted and will maintain the same IP address. In some embodiments, this mapping is stored by the second set of controllers. In other embodiments, the second set of controllers dynamically determines the IP address allocation based on the pod's unique ID. In such embodiments, because the assigned IP addresses correspond to each pod's unique ID (i.e., each pod's ordinal index), the IP addresses are assigned sequentially and the second set of controllers can dynamically determine each pod's IP address. For instance, when a pod fails or powers down and restarts, and the second set of controllers has to provide its assigned IP address to the first set of controllers, the second set of controllers can dynamically determine the pod's IP address based on its unique ID. For example, the second set of controllers, at any time, can determine that for the first pod with ordinal index 0, it is assigned the first IP address in the range, and for the second pod with ordinal index 1, it is assigned the second IP address in the range, and so on.

After allocating the particular IP address to the particular stateful pod, the process 600 provides (at 630) the particular IP address to the first set of controllers to use for the stateful pod. In some embodiments, after allocating the particular IP address to the particular stateful pod, the second set of controllers provides the particular IP address to the first set of controllers for the first set of controllers to define one or more service policies to enforce on data messages associated with the particular stateful pod. In other embodiments, the first set of controllers provides the particular IP address to another controller, such as the Antrea controller 275 of FIG. 2, use the particular IP address to define one or more service policies to enforce on data messages associated with the particular stateful pod. Still, in other embodiments, the second set of controllers provides the particular IP address to the third set of controllers for the third set of controllers to define one or more service policies to enforce on data messages associated with the particular stateful pod. In these embodiments, the managed cluster is a first managed cluster and the data messages are also associated with one or more pods deployed in a second managed cluster managed by a fourth set of one or more controllers. As discussed previously, the third set of controllers is a set of SDN controllers that provides functionalities for the first managed cluster managed by the first set of controllers. The third set of controllers also provides these functionalities to the second managed cluster, and because the first and second managed clusters do not have full visibility of each other, the third set of controllers uses IP addresses from both managed clusters to define network policies to enforce on data messages exchanged between the managed clusters. Then, the process 600 ends.

Figure 7A:
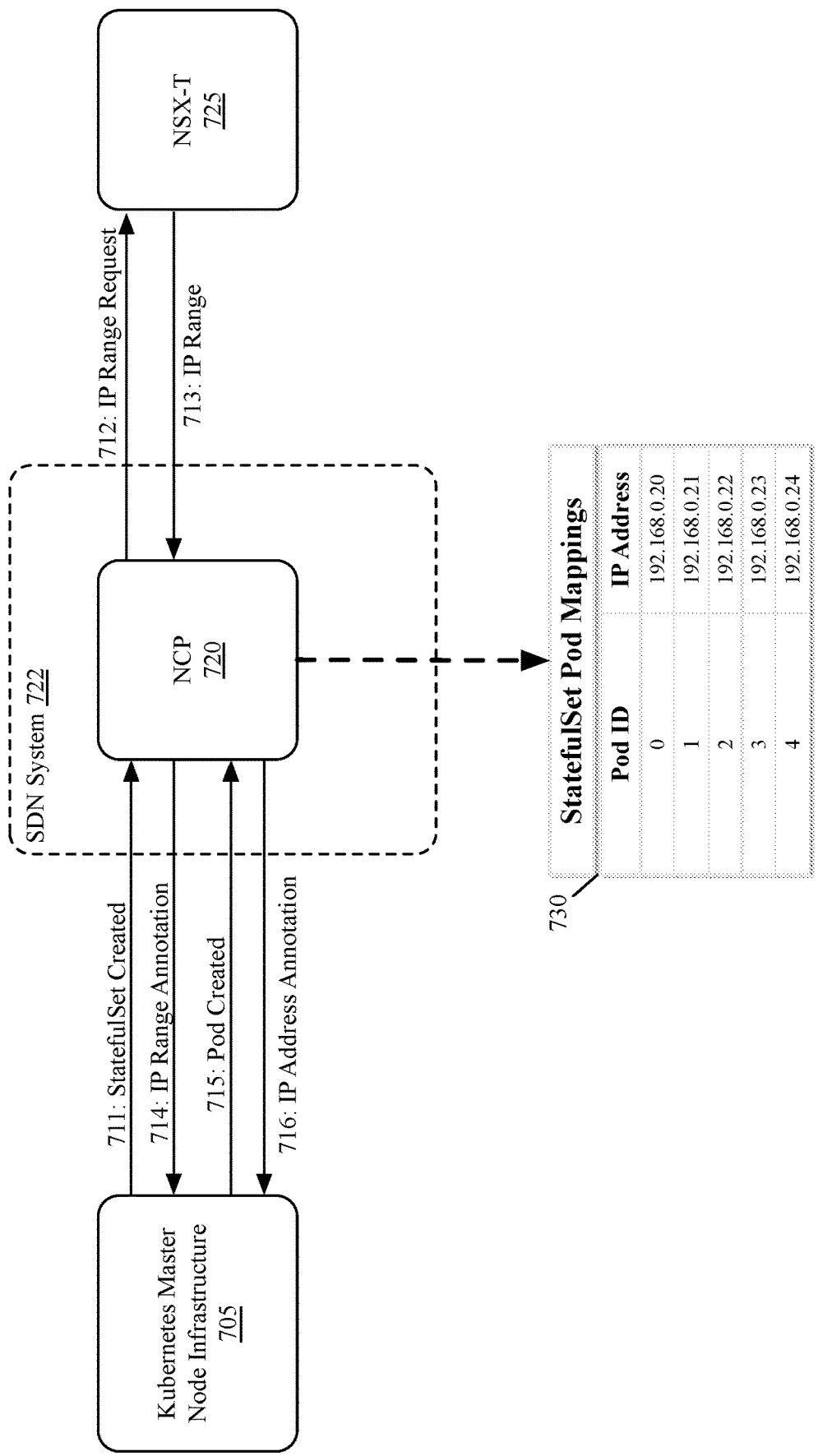
FIGS. 7A-B illustrate the communication between a Kubernetes master node infrastructure an NCP, and NSX-T to allocate IP addresses to stateful pods and to maintain allocated IP addresses to migrated pods.
Figure 7B:
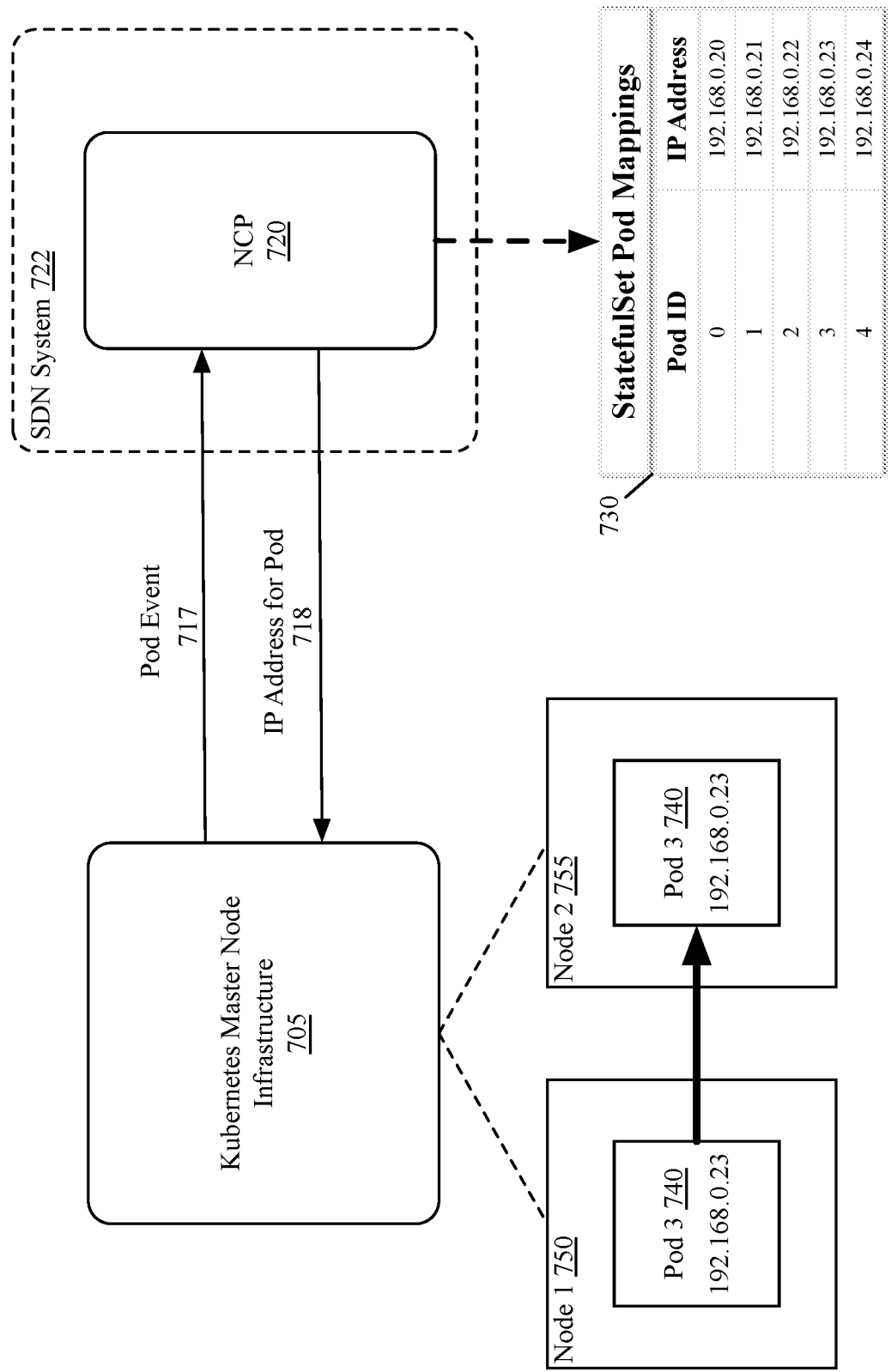

As discussed previously, a Kubernetes master node communicates with an SDN manager system through an NCP to allocate IP addresses to StatefulSet pods. FIGS. 7A-B illustrate this communication between a Kubernetes master node infrastructure 705 an NCP 720, and NSX-T 725 to allocate IP addresses to a StatefulSet and to maintain allocated IP addresses for migrated pods. In some embodiments, the NCP 720 operates on the master node 705, and communicates with a Kube-API server (not shown) operating on the master node 705. In other embodiments, the NCP 720 does not operate on the master node 705. As discussed previously, an NCP, such as the NCP 720, is the interface between the Kube-API server of the master node 705 and an SDN manager system 722 that is used for allocating IP addresses to stateful pods.

First, at 711, the master node infrastructure 705 sends notification to the NCP 720 notifying that a StatefulSet has been created. As discussed previously, an NCP can register for event notifications from a Kube-API server, such as event notifications regarding StatefulSets. The created StatefulSet in some embodiments is associated with a namespace that has a subnet allocated to it, such that all pods for the StatefulSet are within that namespace. In some embodiments, the master node 705 provides an API request for deploying the StatefulSet to the NCP 720 that does not specify an IP address range for the StatefulSet. Notifying the NCP 720 of the StatefulSet creation lets the NCP 720 know IP addresses need to be allocated to each pod deployed for the StatefulSet.

Next, at 712, the NCP 720 requests an IP address range from NSX-T 725. In some embodiments, the requested IP address range is requested to be within the subnet of the associated namespace. Then, the NCP 720 receives the requested IP range within the subnet of the associated namespace from NSX-T 725 at 713. In some embodiments, the received IP range includes IP addresses not in the namespace subnet, so the NCP 720 sends an error notification to NSX-T 725 notifying of an invalid IP address range, and NSX-T 720 provides a correct IP range to the NCP 720. Once this IP range has been given to the NCP 720, no other pods or machines can be assigned IP addresses from the range, meaning that the IP range is reserved by the StatefulSet in NSX-T. After receiving the IP address range, at 714, the NCP 720 provides the IP address range in an annotation to the master node infrastructure 705. In some embodiments, the IP range is provided by the NCP 720 in an API for the master node infrastructure 705 to add as an annotation into the API request for deploying the StatefulSet, as shown in the API request 500 in FIG. 5. Although step 714 is shown in this figure, in some embodiments, 714 is not performed.

At 715, the master node infrastructure 705 notifies the NCP 720 of a deployment of a stateful pod for the StatefulSet. In some embodiments, the NCP 720 is notified of all stateful pods that are to be deployed for the StatefulSet, while in other embodiments, the NCP 720 is notified of one stateful pod at a time. When the NCP 720 is notified of a pod deployment, the NCP 720 receives from the master node infrastructure the unique identity of the pod so the NCP 720 can allocate an IP address from the range provided by NSX-T 725 based on the pod's identity. In some embodiments, the NCP 720 stores the pod ID to IP address allocation in a mapping table, such as the table 730. Each time the NCP 720 allocates an IP address to a pod in a StatefulSet, the NCP stores the mapping in this table 730. After the IP address has been assigned to the stateful pod, at 716, the NCP 720 sends an API and annotate the notes or metadata of the stateful pod to include the allocated IP address. Although step 716 is shown in this figure, in some embodiments, 716 is not performed.

In some embodiments, an IP address range is specified to allocate to a set of stateful pods that includes a larger number of pods than there are IP addresses in the specified range. This may be due to adding more stateful pods to the set after the range was determined by NSX-T 725. In such embodiments, when there are no more IP addresses in the range to allocate, but there are still one or more pods to deploy for the set, an error notification is sent from the NCP 720 to NSX-T 725 notifying that there are no more IP addresses to allocate. IP address allocation will not continue until more IP addresses are provided to allocate to pods in the set.

By maintaining a mapping table 730 of each pod's unique identity (e.g., each pod's ordinal index) to its allocated IP address, each pod can keep their allocated IP addresses, even in the event of a pod failure, rescheduling (migration), etc. However, in other embodiments, an actual mapping table is not stored by the NCP 720. In such embodiments, because the assigned IP addresses correspond to each pod's unique ID (i.e., each pod's ordinal index), the IP addresses are assigned sequentially and the NCP 720 can dynamically determine each pod's IP address. For instance, when a pod fails or powers down and restarts, and the NCP 720 has to provide its assigned IP address to the master node infrastructure 705, the NCP 720 can dynamically determine the pod's IP address based on its unique ID. For example, the NCP 720, at any time, can determine that for the first pod with ordinal index 0, it is assigned the first IP address in the range, and for the second pod with ordinal index 1, it is assigned the second IP address in the range, and so on.

FIG. 7B illustrates the communication between the master node infrastructure 705 and the NCP 720 when the NCP 720 needs to provide an assigned IP address for a pod when the pod experiences a lifecycle management (LCM) event. In this figure, a pod 740 is being migrated from a first node 750 to a second node 755, however, this communication can be used for any LCM or pod rescheduling events.

The master node infrastructure 705 migrates the stateful pod 740 from the first node 750 to the second node 755. Upon doing so, the master node infrastructure, at 717, notifies the NCP 720 of the pod migration and requests the allocated IP address. After receiving this notification, the NCP 720 determines the allocated IP address and provides it to the master node infrastructure at 718. As discussed previously, the NCP 720 can determine the allocated IP address by performing a lookup in the mapping table 730, or can dynamically determine the allocated IP address based on the pod's unique ID. By providing the allocated IP address to the master node infrastructure 705, the pod 740 can maintain the same IP address while deployed on the second node 755.

In some embodiments, a Kubernetes networking system deletes a StatefulSet altogether. In such embodiments, the master node 705 notifies the NCP 720 that the StatefulSet has been deleted, and the NCP 720 is able to delete the mapping table 730 and notify NSX-T 725 that the IP range is now available for assignment to other machines. If the StatefulSet were to be re-instantiated, the master node infrastructure 705 and the NCP 720 would perform steps 711-716 again to recreate the mapping table 730, either using the same IP address range or using a different IP address range still within the subnet of the allocated namespace.

Figure 8:
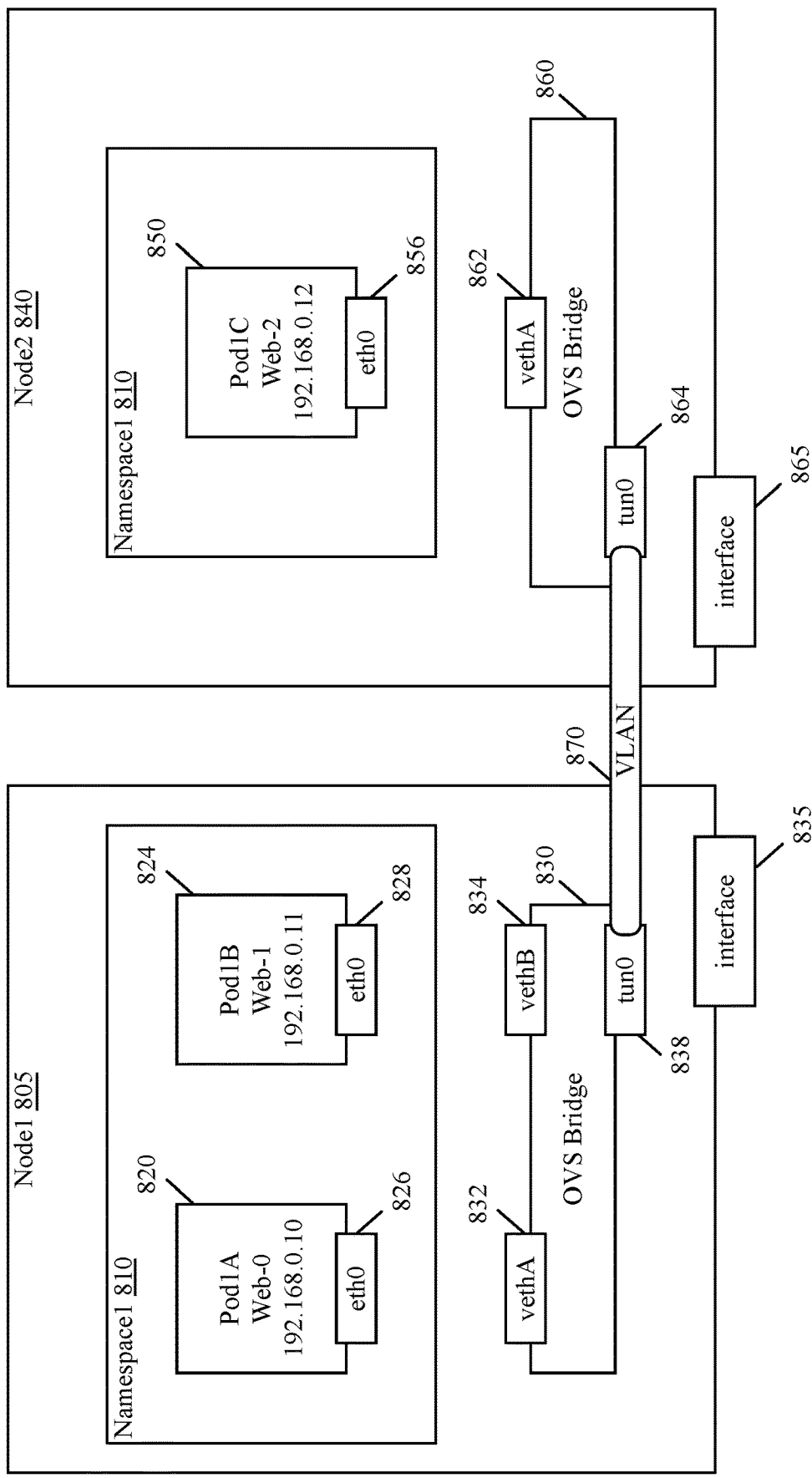
FIG. 8 illustrates an example StatefulSet deployed in a system using assigned IP addresses based on each endpoint's "sticky" identity.

FIG. 8 illustrates an example StatefulSet deployed in a system with assigned IP addresses from a specified IP range. A StatefulSet can include any number of pods executing on any number of worker nodes. The worker nodes can be virtual machines or host computers. All pods 820, 824, and 850 belong to a namespace 810. In this example, the StatefulSet is to be allocated IP addresses from an IP range of 192.168.0.10 to 192.168.0.20. The first instantiated pod 820 for the StatefulSet resides on node 805 and is assigned the first IP address in the range. The second instantiated pod 824 also resides on node 805 and is assigned the second IP address in the range. Third instantiated pod resides on another node 840 and is assigned the third IP address in the range.

For traffic from the first pod 820 to the second pod 824, data messages traverse the Ethernet interface 826, the virtual Ethernet interface 832 associated with pod 820, through the OVS bridge 830 to the virtual Ethernet interface 834 associated with pod 824, and to Ethernet interface 828 to reach the second pod 824. Traffic from the second pod 824 to the first pod 820 follow this path in the reverse direction.

For traffic sent between pods on different nodes, tunnel interfaces 838 and 864 of the OVS bridges 830 and 860 are used to create an overlay tunnel 870 between the nodes 805 and 840. The tunnel 870 is used to send data traffic between pods that execute on different nodes and belong to the same subnet, in some embodiments. In some such embodiments, the data is encapsulated at the source tunnel interface, decapsulated at the destination tunnel interface, and injected through the destination tunnel port to the OVS bridge where it is finally forwarded to its destination. The tunnel 870, in some embodiments, is a VXLAN (virtual extensible LAN) tunnel, while in other embodiments, the tunnel 870 is a Geneve tunnel, or any other OVS supported tunneling protocol.

For two pods that execute on different nodes, but belong to the same subnet and namespace, data traffic is forwarded using the tunnel interfaces 838 and 864 as mentioned above. For instance, data messages sent from the pod 820 on the node 805 to the pod 850 on the node 840 traverses this path. The pods 820 and 850 both belong to the same subnet and namespace 810. As such, the data traffic is sent from the Ethernet interface 826 of the pod 820 to the virtual Ethernet interface 832. The virtual Ethernet interface 832 then forwards the packet to the tunnel interface 838 for encapsulation.

After the data has been encapsulated, the tunnel interface 838 forwards the data to the tunnel interface 864 on the destination node 840 such that the data traffic flows through the interface 835 of the node 805 and traverses intervening network fabric until it reaches interface 865 of the destination node 840. The data is then sent to the tunnel interface 864 for decapsulation and forwarding to the virtual Ethernet interface 862 corresponding to the destination pod 850. In some embodiments, the nodes 805 and 840 execute on different host computers. In some such embodiments, the intervening network fabric includes wired or wireless connections and various network forwarding elements (e.g., switches, routers, etc.). Alternatively, in some embodiments, the nodes 805 and 840 execute on the same host computer and the intervening network fabric includes a software switch executing on the host computer, and the software switch includes ports for connecting the nodes to each other and to a NIC of the host computer for exchanging communications with elements external to the host computer.

In some embodiments, the deployment of these pods 820, 824, and 850 is directed based on a received StatefulSet API request, and based on IP addresses assigned by an NCP or adapter. Some embodiments may also direct the addition or removal of pods for the StatefulSet based on another API request. Pods are removed in some embodiments in reverse order, meaning the last deployed pod is removed first and the first deployed pod is removed last. In some embodiments, the persistent volume for each pod is not deleted, even as pods are removed, such that pods can be re-instantiated and keep the same stored information as before. And, as discussed previously, because a pod's IP address, allocated from the specified IP range, is assigned based on the pod's unique identity, the IP address also remains the same when a pod is removed and then re-instantiated.

Figure 9:
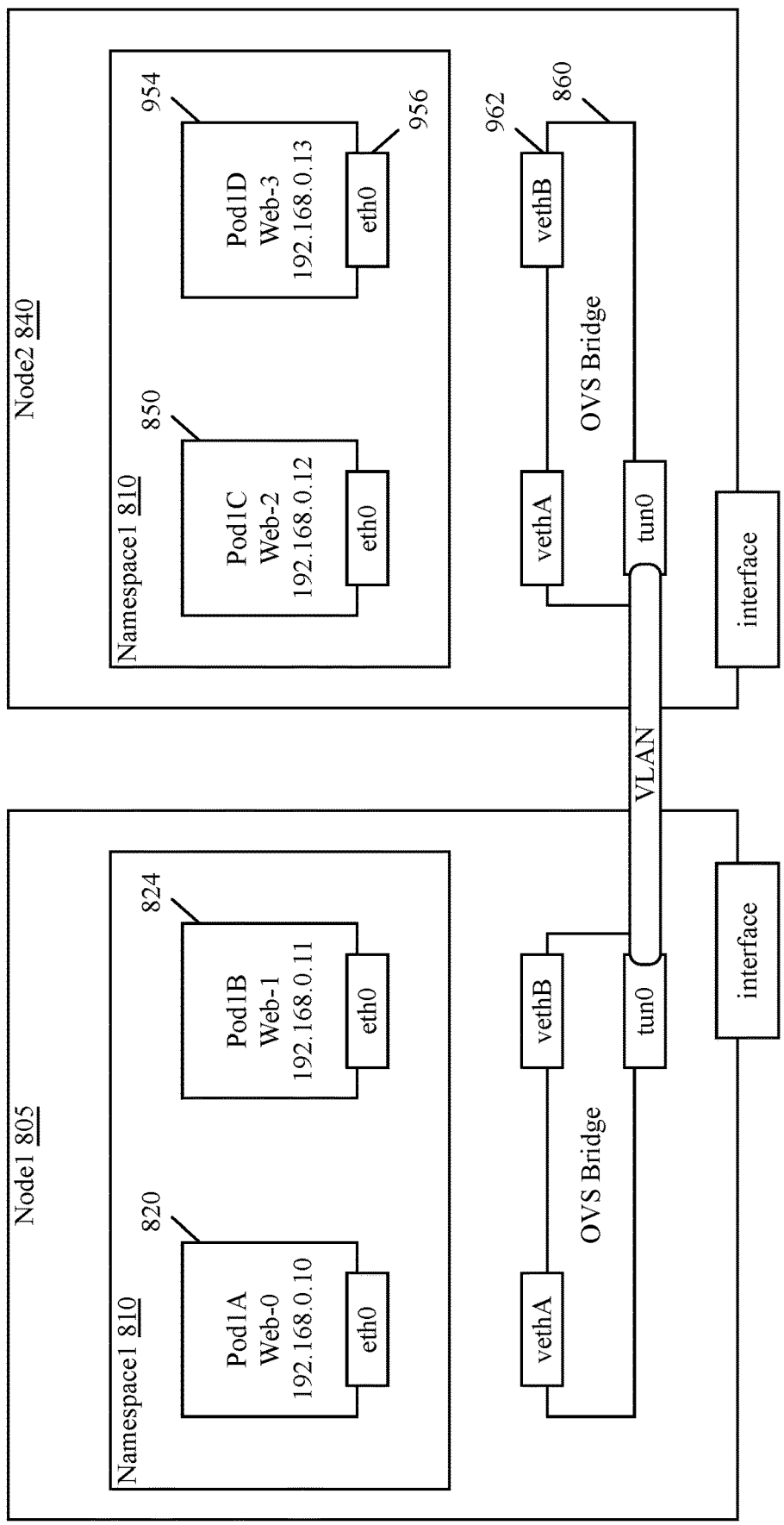
FIG. 9 illustrates an example system for deploying additional pods for an already deployed StatefulSet.

FIG. 9 illustrates the StatefulSet described in FIG. 8. However, in this example, a new pod is deployed for an already deployed StatefulSet of pods. The StatefulSet shown in this example has already deployed the pods 820 and 824 on node 805, and pod 850 on node 840. All of these pods 820, 824, and 850 belong to the same namespace 810, and are assigned IP addresses from a specified range based on their identities (i.e., their ordinal indexes). Each pod has an Ethernet interface and is associated with a virtual Ethernet interface for communication with each other. In this example, a new fourth pod 954 is instantiated on node 840.

This new pod 954 is assigned the next available ordinal index and the next available IP address in the specified range for the StatefulSet. The pod 954 is also associated with an Ethernet interface 956, and a virtual Ethernet interface 962 connected to the OVS bridge 860 of node 840 for communicating with the other pods 820, 824, and 850.

Figure 10:
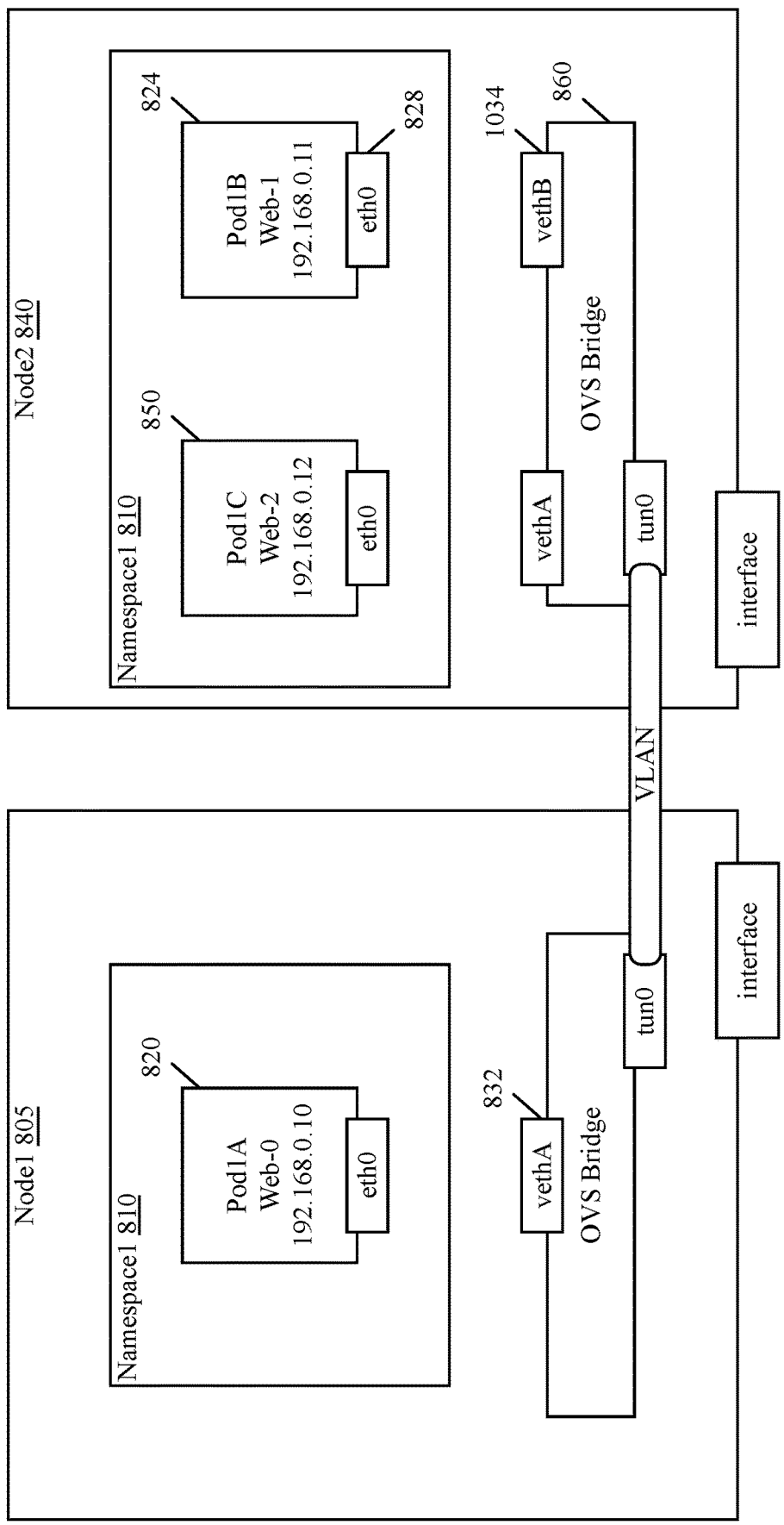
FIG. 10 illustrates an example system for migrating one or more pods for a deployed StatefulSet.

As discuss previously, in some embodiments, a pod of a StatefulSet is migrated from one worker node to another. FIG. 10 illustrates this scenario. Pod 820 still executes on node 805, and pod 850 still executes on node 840. Pod 824, on the other hand, has been migrated from node 805 to node 840. However, because each pod is associated with a "sticky" identity and is assigned an IP address based on its "sticky" identity, the IP address assigned to the pod 824 remains the same; it is still the second IP address from the specified range because it is the pod with the second ordinal index (i.e., with an ordinal index of 1). Because the IP allocation is maintained by the NCP, the Kubernetes networking system is able to assign the same IP address to the pod 824. In some embodiments, this migration is performed because of an API request received by a Kube-API server to migrate the pod 824. The API request is processed and the migration is performed by the compute managers and controllers that deploy the pods on the nodes in the cluster. Because pod 824 now resides on node 840, its ethernet interface 828 resides along with it on node 840, and pod 824 is now associated with a virtual Ethernet interface 1034 connected to the OVS bridge 860 of node 840.

Assigning resilient IP address to pods has many benefits. For example, in some embodiments, IP addresses assigned to pods are used inside or outside the managed cluster, and the managed cluster does not want to tell all internal or external clients about any updated IP addresses of pods. By resiliently assigning IP addresses to these pods, no updates to IP addresses need to be provided. As another example, legacy systems that are being onboarded to a cloud use IP addresses to identify services available in their legacy systems (e.g., on-premises systems), namely, some embodiments advertise service IP addresses instead of the service's name. Hence, it is more beneficial to assign resilient IP addresses rather than IP addresses that can change because all clients that access these services would have to be reconfigured. And, as another example, network policies can be defined for individual pods by specifying their IP addresses, rather than defining network policies based on a load balancing service IP address which provides data messages to the individual pods. Even if a pod crashes and has to restart, or if a pod moves from one worker node to another, its IP address will not change, and the network policies can specify and individual pods and do not need to be updated. Hence, because the IP address assigned to pod 824 remains unchanged, the event of pod migration does not affect clients or network policies that use this pod's IP address.

Figure 11:
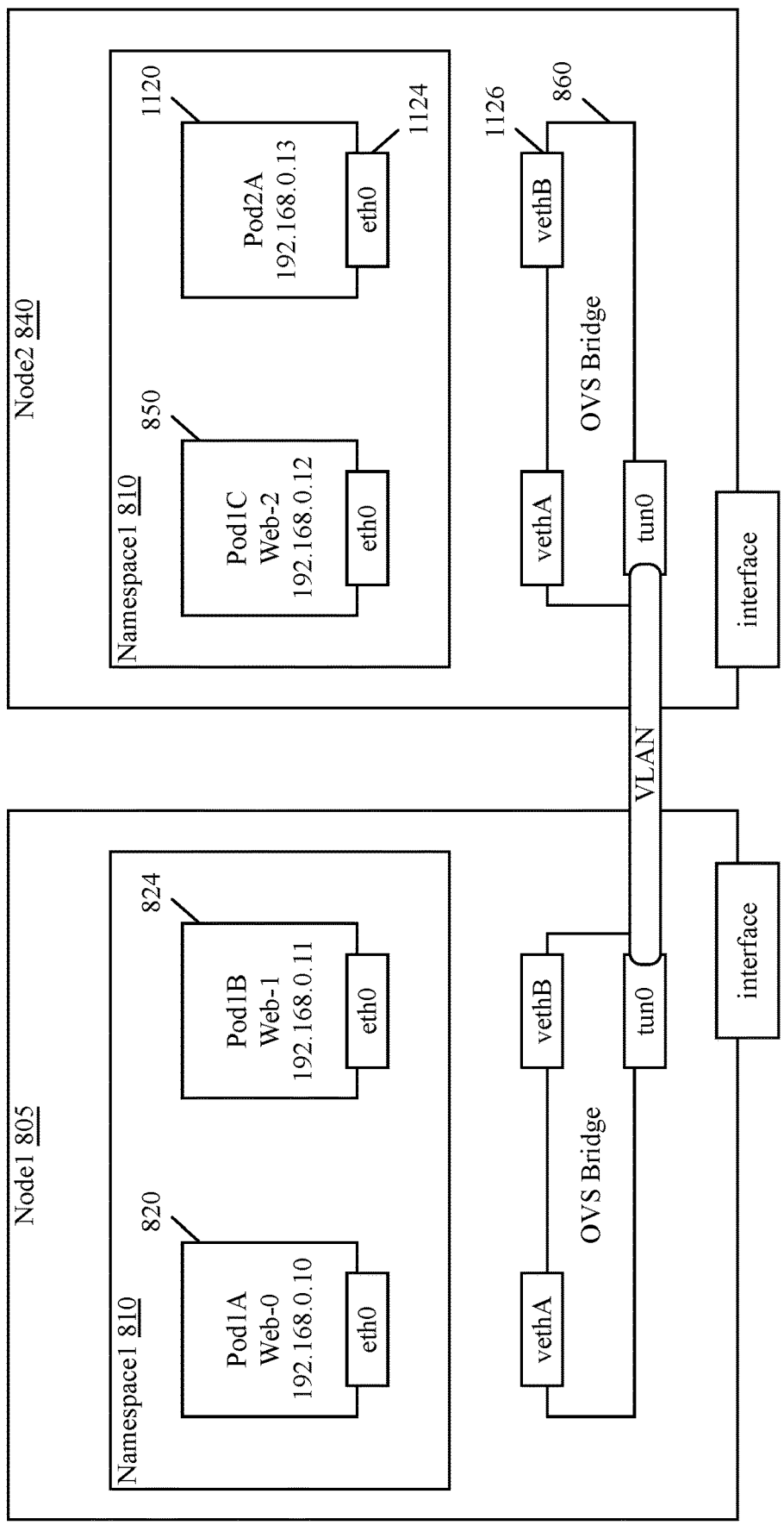
FIG. 11 illustrates an example system in which a pod not in a StatefulSet is already assigned an IP address in the IP range specified for the StatefulSet.

In some embodiments, after an IP address range is specified for a set of stateful pods, other pods or machines not in the stateful set cannot be assigned an IP address from the range, i.e., the IP addresses are reserved by NSX-T. However, in some embodiments, pods that are not part of a StatefulSet are already deployed and assigned an IP address specified in the IP range for the StatefulSet before the IP range is specified. FIG. 11 illustrates this scenario. The StatefulSet is instantiated, including pods 820 and 824 on node 805, and pod 850 on node 840. These three pods all belong to the namespace 810. In this example, a fourth pod (not shown) needs to be deployed for the StatefulSet. However, a non-StatefulSet pod 1120 belonging to the namespace 810 is assigned the next (i.e., fourth) IP address in the IP range specified for the StatefulSet. This pod 1120 is associated with an Ethernet interface 1124 and a virtual Ethernet interface 1126 connected to OVS bridge #760. Because the fourth IP address in the specified range has already been allocated to another pod not in the StatefulSet, the fourth pod for the StatefulSet is unable to be allocated that IP address. In some embodiments, an error notification is sent from the NCP to NSX-T notifying of this problem, and IP address allocation of the StatefulSet will halt until the fourth IP address in the range is available, i.e., if the pod 1120 is assigned a different IP address or is removed completely.

Figure 12:
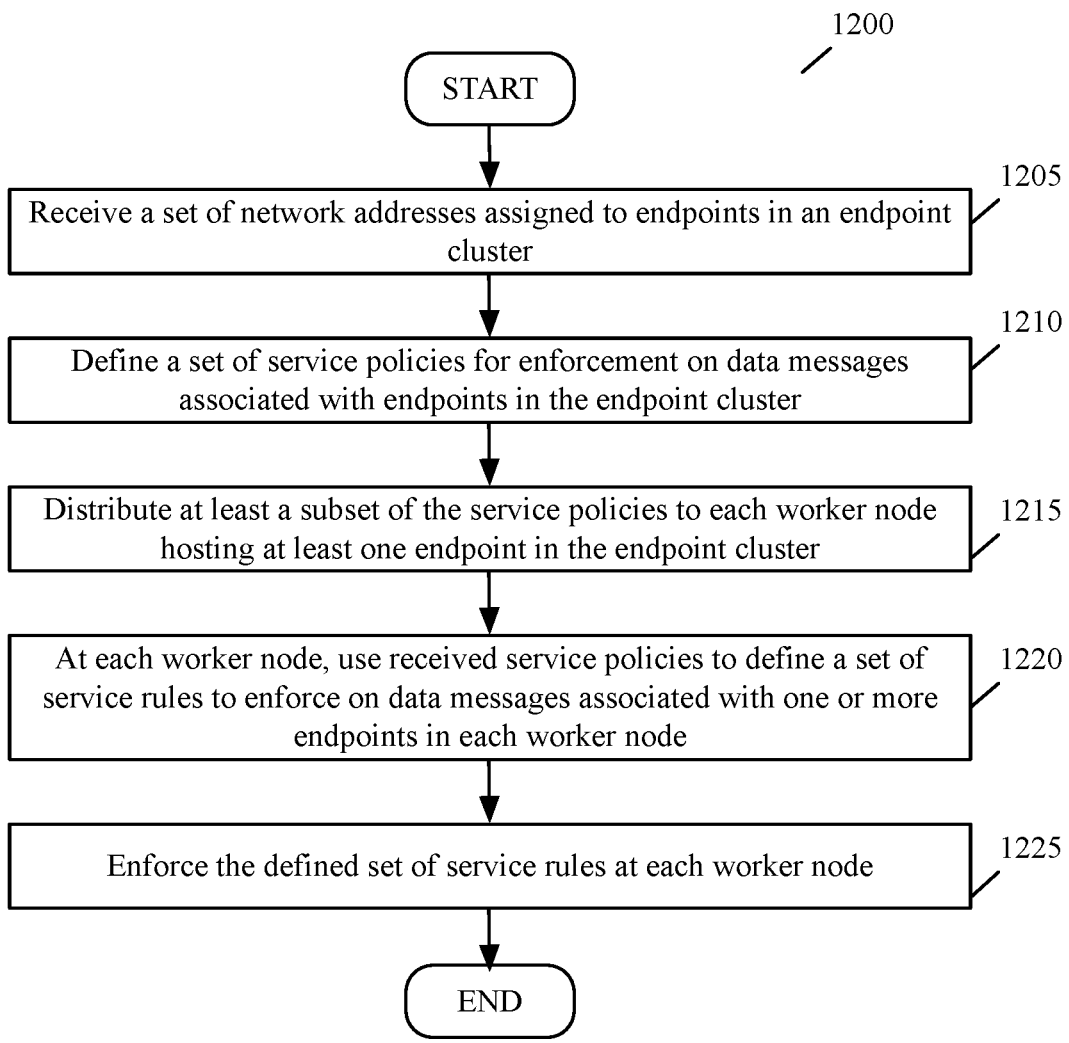
FIG. 12 conceptually illustrates a process of some embodiments for using network addresses assigned to endpoints in a StatefulSet for defining service rules for data messages associated with the endpoints.

As discussed previously, network policies, such as middlebox service policies, can be defined for endpoints of a StatefulSet based on their "sticky" IP addresses. FIG. 12 conceptually illustrates a process 1200 of some embodiments for defining service rules based on network addresses assigned to endpoints of an endpoint cluster configured by a first set of one or more controllers. This process 1200 in some embodiments is performed by a second controller cluster for a set of worker nodes on which the endpoint cluster is deployed, and a set of agents operating on the worker nodes. The second controller cluster operates on a master worker node and the set of agents each operate on a worker node, such as the controller and agents of the Antrea networking solution in FIG. 2. While the process 1200 is described in relation to defining service policies and rules, one of ordinary skill would understand that any network policies for pods can be defined and applied for stateful pods based on their IP addresses allocated according to their unique identities.

The process 1200 begins by receiving (at 1205) a set of network addresses assigned to endpoints in an endpoint cluster. The controller, which does not configure the endpoints of the cluster, receives IP addresses assigned to each endpoint deployed for a stateful application. These IP addresses were assigned to each endpoint based on the endpoint's "sticky" identity. In some embodiments, the controller receives the network addresses directly from the NCP or adapter. In other embodiments, the controller receives the network addresses from an API server, which receives them from the NCP or adapter.

Next, the process 1200 defines (at 1210) a set of service policies for enforcement on data messages associated with endpoints in the endpoint cluster. In some embodiments, the controller uses the received network addresses to define service policies to be enforced at the worker nodes hosting the endpoints. The service policies are in some embodiments middlebox service policies. Then, the process 1200 distributes (at 1215) at least a subset of the defined set of service policies to each worker node hosting at least one endpoint in the endpoint cluster. The controller determines which of the service policies are to be applied at each worker node, and distributes the appropriate service policies to the agents operating on the worker nodes.

Then, at each worker node, the process 1200 uses (at 1220) the received subset of service policies to define a set of service rules to enforce on data messages associated with one or more endpoints on the worker node. Each agent receives the service policies applicable to their worker node. Using those service policies, each agent defines service rules to enforce at the worker node. In some embodiments, the agents translate the service policies into OVS flows to apply at the worker node. After service rules have been defined, the process 1200 enforces (at 1225) the defined set of service rules at each worker node. In some embodiments, the agents themselves enforce the service rules. In other embodiments, the agents provide the service rules to service engines operating on the worker nodes for enforcement.

In some embodiments, the defined service rules are to be enforced on data messages exchanged between the endpoints in the endpoint cluster. In other embodiments, the defined service rules are to be enforced on data messages exchanged with endpoints in the endpoint cluster and endpoints in another endpoint cluster configured by the same controller cluster, i.e., the first set of controllers. Still, in other embodiments, the set of service rules define service rules to enforce on data messages exchanged with the endpoints in the endpoint cluster and endpoints in another endpoint cluster configured by a third set of controllers. This third set of controllers provides the functionality of deploying stateful endpoints. Endpoints in another endpoint cluster can be deployed on the same set of worker nodes as the endpoint cluster whose network addresses were used to defined the service rules, or can be deployed on a different set of worker nodes.

After the service rules have been defined and are being enforced, the process 1200 ends. This process 1200 is performed in order to define service rules using the network addresses assigned to endpoints based on their "sticky" identities. In doing so, regardless of whether endpoints fail and restart, are removed, or are migrated, the endpoints' assigned network addresses do not change, and, hence, the service rules do not need to be updated.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
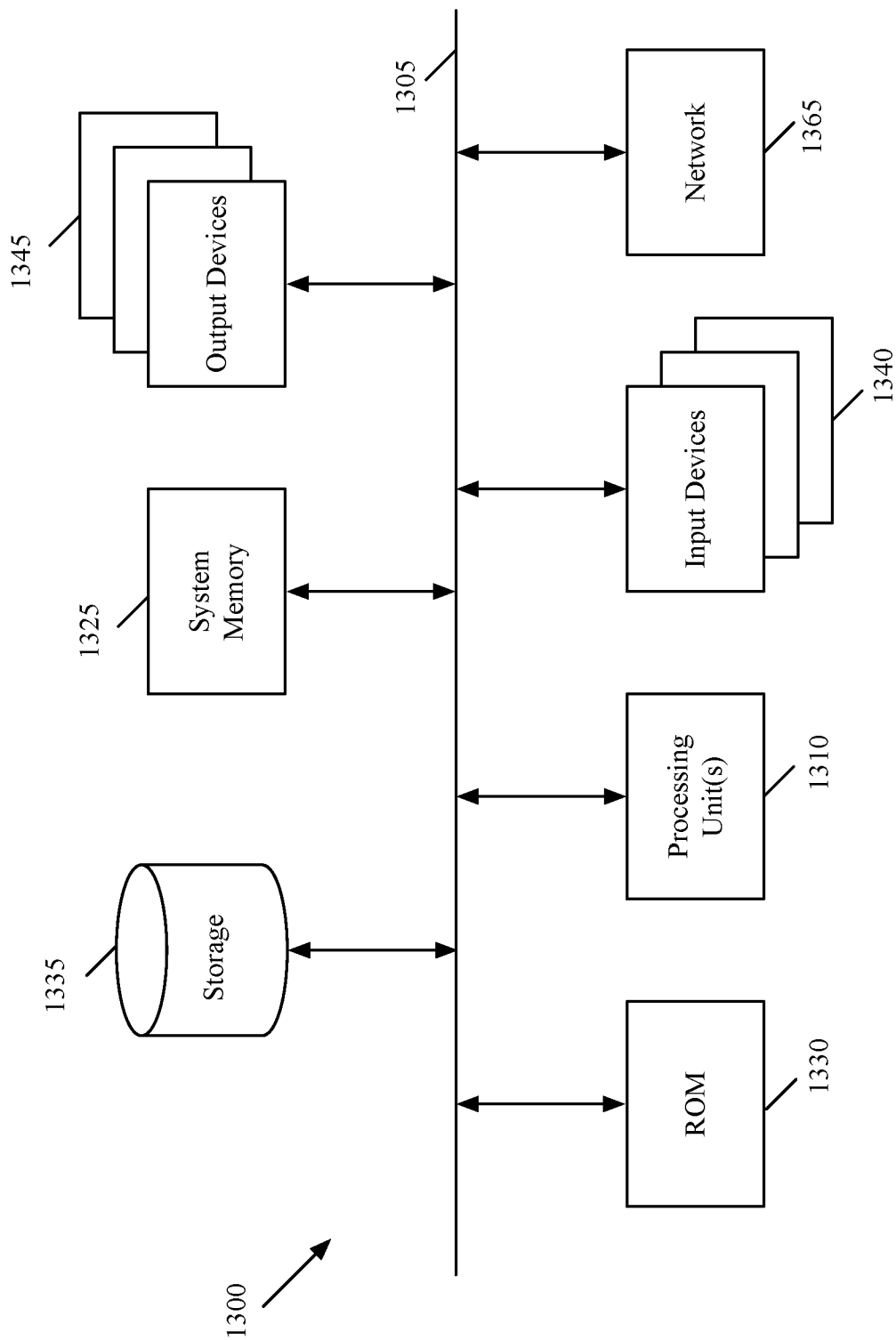
FIG. 13 conceptually illustrates an electronic system with which some embodiments of the invention are implemented.

FIG. 13 conceptually illustrates a computer system 1300 with which some embodiments of the invention are implemented. The computer system 1300 can be used to implement any of the above-described computers and servers. As such, it can be used to execute any of the above described processes. This computer system includes various types of non-transitory machine readable media and interfaces for various other types of machine readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a flash drive, etc.) as the permanent storage device. Like the permanent storage device 1335, the system memory 1325 is a read-and-write memory device. However, unlike storage device 1335, the system memory is a volatile read-and-write memory, such a random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the computer system. The input devices 1340 include alphanumeric keyboards and pointing devices (also called "cursor control devices"). The output devices 1345 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples computer system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for resiliently associating Internet Protocol (IP) addresses with pods that each have unique identifiers (IDs) in a managed cluster of worker nodes, the managed cluster managed by a first set of one or more controllers of the managed cluster, wherein said resilient association between the IP addresses and the pods is maintained even when pods are moved between worker nodes, the method comprising:
at a controller of a second set of one or more controllers:
receiving notification regarding deployment, on a first worker node of the managed cluster, of a particular stateful pod with a particular ID in the first set of one or more controllers;
allocating a particular IP address to the particular stateful pod;
creating a mapping between the particular IP address and the particular ID in order to maintain the allocation of the particular IP address to the particular stateful pod, such that when the particular stateful pod migrates from the first worker node to a second worker node of the managed cluster, the particular IP address continues to be assigned to the stateful pod; and
providing the particular IP address to the first set of controllers to use for the particular stateful pod.

2. The method of claim 1, wherein the second set of controllers comprise local controllers deployed in the managed cluster by a third set of controllers operating outside of the managed cluster, the third set of controllers configuring the second set of controllers to perform the receiving, allocating, creating, and providing.

3. The method of claim 2, wherein the first and second sets of controllers operate at a first site with the managed cluster while the third set of controllers operates at a second site.

4. The method of claim 3, wherein the first set of controllers is provided by a first vendor while the third set of controllers is provided by a second vendor, the third set of controllers enabling features that are natively deficient in the managed cluster as managed by the first set of controllers.

5. The method of claim 4, wherein the third set of controllers enables the features through the second set of controllers.

6. The method of claim 2 further comprising:
before receiving notification regarding deployment of the particular stateful pod:
receiving notification regarding deployment of a plurality of stateful pods including the particular stateful pod;
requesting an IP address range from the third set of controllers; and
receiving the IP address range from the third set of controllers.

7. The method of claim 6, wherein the particular IP address is allocated from the IP address range.

8. The method of claim 7 further comprising sending an Application Programming Interface (API) request to the first set of controllers specifying the plurality of stateful pods and the IP address range.

9. The method of claim 8, wherein the IP address range is restricted to a subnet configured for a namespace of the plurality of stateful pods.

10. The method of claim 9, wherein the first set of controllers assigns a unique ID to each stateful pod in the plurality of stateful pods, the unique ID comprising, for each stateful pod, (i) an ordinal index specifying an order of the stateful pod in which it is to be deployed, (ii) a stable network identity specifying a name of the plurality of stateful pods and the ordinal index, and (iii) a stable storage specifying a persistent volume claim of provisioned storage allocated to the stateful pod.

11. The method of claim 10, wherein each stateful pod is assigned a sequential IP address from the IP address range according to their associated unique ID, such that a first deployed stateful pod is assigned a first IP address from the IP address range and a second deployed stateful pod is assigned a subsequent, second IP address from the IP address range.

12. The method of claim 1, wherein the notification is a first notification, the method further comprising:
receiving a second notification that the particular pod has migrated from the first worker node to the second worker node; and
providing to the first set of controllers the particular IP address.

13. The method of claim 1, wherein the notification is a first notification, the method further comprising:
receiving a second notification that the particular pod has failed and restarted on the first worker node; and
providing to the first set of controllers the particular IP address.

14. The method of claim 1, wherein providing the particular IP address to the first set of controllers comprises providing the particular IP address to the first set of controllers for the first set of controllers to define one or more service policies to enforce on data messages associated with the particular stateful pod.

15. A non-transitory machine readable medium storing a program for execution by at least one processing unit for resiliently associating Internet Protocol (IP) addresses with pods that each have unique identifiers (IDs) in a managed cluster of worker nodes, the managed cluster managed by a first set of one or more controllers of the managed cluster, wherein said resilient association between the IP addresses and the pods is maintained even when pods are moved between worker nodes, the program comprising sets of instructions for:
 at a controller of a second set of one or more controllers:
  receiving notification regarding deployment, on a first worker node of the managed cluster, of a particular stateful pod with a particular ID in the first set of one or more controllers;
  allocating a particular IP address to the particular stateful pod;
  creating a mapping between the particular IP address and the particular ID in order to maintain the allocation of the particular IP address to the particular stateful pod, such that when the particular stateful pod migrates from the first worker node to a second worker node of the managed cluster, the particular IP address continues to be assigned to the stateful pod; and
  providing the particular IP address to the first set of controllers to use for the particular stateful pod.

16. The non-transitory machine readable medium of claim 15, wherein the second set of controllers comprise local controllers deployed in the managed cluster by a third set of controllers operating outside of the managed cluster, the third set of controllers configuring the second set of controllers to perform the receiving, allocating, creating, and providing.

17. The non-transitory machine readable medium of claim 16, wherein the program comprises further instructions for:
 before receiving notification regarding deployment of the particular stateful pod:
  receiving notification regarding deployment of a plurality of stateful pods including the particular stateful pod;
  requesting an IP address range from the third set of controllers; and
  receiving the IP address range from the third set of controllers.

18. The non-transitory machine readable medium of claim 17, wherein the particular IP address is allocated from the IP address range.

19. The non-transitory machine readable medium of claim 15, wherein the notification is a first notification, the program comprising further instructions for:
 receiving a second notification that the particular pod has migrated from the first worker node to the second worker node; and
 providing to the first set of controllers the particular IP address.

20. The non-transitory machine readable medium of claim 15, wherein the notification is a first notification, the program comprising further instructions for:
 receiving a second notification that the particular pod has failed and restarted on the first worker node; and
 providing to the first set of controllers the particular IP address.

* * * * *